(12) United States Patent
Matsushima

(10) Patent No.: US 8,698,988 B2
(45) Date of Patent: Apr. 15, 2014

(54) LIQUID CRYSTAL DEVICE HAVING VIEWING ANGLE CONTROL PIXELS

(75) Inventor: Toshiharu Matsushima, Azumino (JP)

(73) Assignee: Japan Display West Inc., Aichi-Ken (JP)

( * ) Notice: Subject to any disclaimer, the term of this patent is extended or adjusted under 35 U.S.C. 154(b) by 1033 days.

(21) Appl. No.: 12/003,722

(22) Filed: Dec. 31, 2007

(65) Prior Publication Data

US 2008/0165297 A1   Jul. 10, 2008

(30) Foreign Application Priority Data

Jan. 9, 2007   (JP) .................................. 2007-001095
Nov. 6, 2007   (JP) .................................. 2007-288141

(51) Int. Cl.
*G02F 1/1343*   (2006.01)
*G02F 1/1335*   (2006.01)

(52) U.S. Cl.
USPC ............................ 349/141; 349/106; 349/108

(58) Field of Classification Search
USPC .......................................... 349/141, 106, 108
See application file for complete search history.

(56) References Cited

U.S. PATENT DOCUMENTS

| 2006/0244888 A1* | 11/2006 | Ohta et al. ..................... 349/141 |
| 2006/0267905 A1 | 11/2006 | Nishino et al. |
| 2007/0121047 A1* | 5/2007 | Chung et al. ................... 349/141 |
| 2007/0153200 A1* | 7/2007 | Kazuyoshi ..................... 349/141 |
| 2007/0176872 A1* | 8/2007 | Kazuyoshi et al. ............. 345/90 |

FOREIGN PATENT DOCUMENTS

| JP | A-11-30783 | 2/1999 |
| JP | A 2004-361917 | 12/2004 |
| JP | A 2005-275342 | 10/2005 |
| JP | A 2006-64882 | 3/2006 |
| JP | A 2006-72239 | 3/2006 |
| JP | A 2006-106439 | 4/2006 |
| JP | A-2006-337600 | 12/2006 |
| JP | A-2007-178736 | 7/2007 |
| JP | A-2007-178738 | 7/2007 |
| JP | A-2007-178739 | 7/2007 |

OTHER PUBLICATIONS

Jin, H.S., et al., "P-139: Novel Viewing-Angle Controllable TFT-LCD," *SID 06 Digest*, pp. 729-731 (2006).

* cited by examiner

*Primary Examiner* — Lauren Nguyen
(74) *Attorney, Agent, or Firm* — K&L Gates LLP

(57) ABSTRACT

A liquid crystal device includes a first substrate, a second substrate, a liquid crystal layer, a display pixel, and a viewing angle control pixel. The liquid crystal layer is provided between the first substrate and the second substrate. The display pixels and the viewing angle control pixels are arranged in a planar region of the first substrate and second substrate to form a display area. Each of the display pixels and each of the viewing angle control pixels each drive the liquid crystal layer by electric field generated between a first electrode and a second electrode. In each of the viewing angle control pixels, a direction of a plane along which electric field is generated between the first electrode and the second electrode is substantially parallel to an initial alignment direction of liquid crystal molecules of the liquid crystal layer.

17 Claims, 18 Drawing Sheets

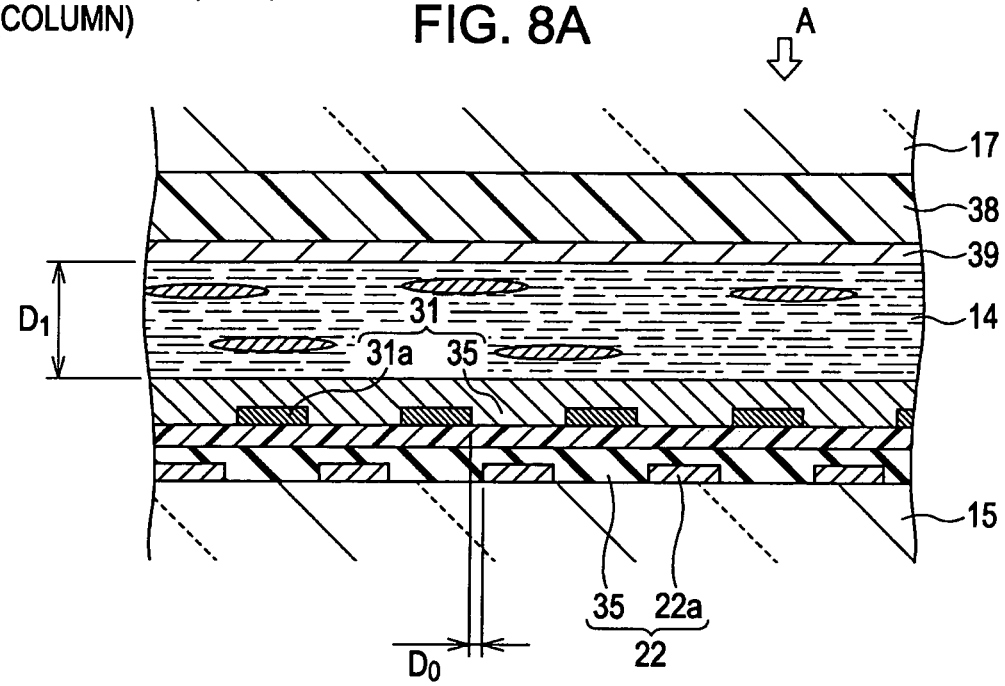
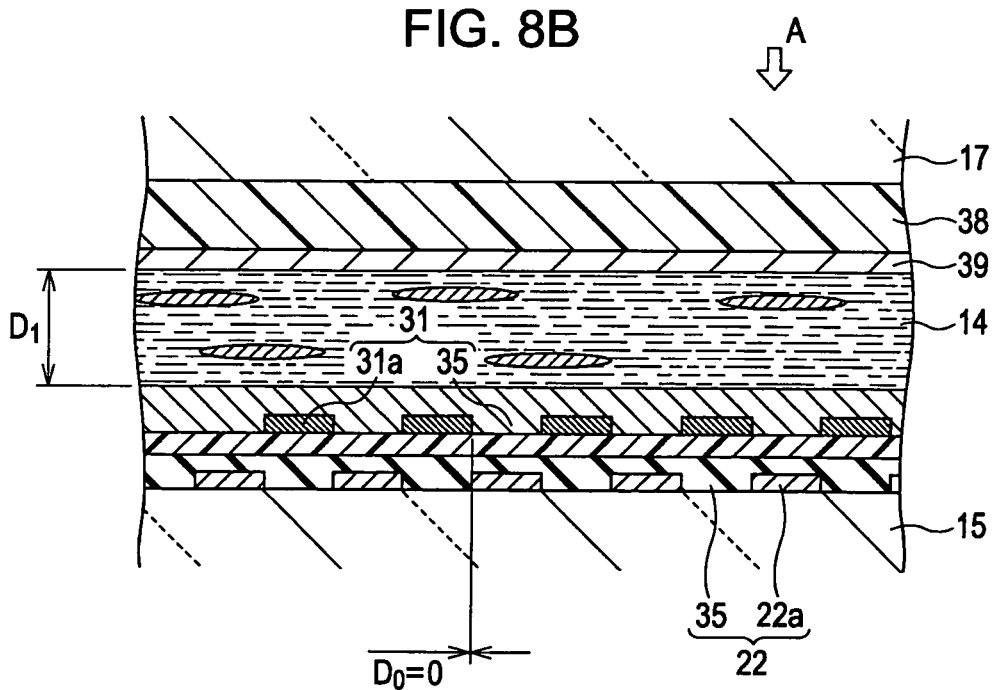

LIQUID CRYSTAL DEVICE HAVING VIEWING ANGLE CONTROL PIXELS

The entire disclosure of Japanese Patent Application Nos. 2007-001095, filed Jan. 9, 2007 and 2007-288141, filed Nov. 6, 2007 are expressly incorporated by reference herein.

BACKGROUND

1. Technical Field

The present invention relates to a liquid crystal device and an electronic apparatus that are provided with viewing angle control function of switching a wide viewing angle visible state and a narrow viewing angle visible state.

2. Related Art

Currently, a liquid crystal device is widely used in an electronic apparatus, such as a cellular phone, a personal digital assistants, or a computer display. For example, the liquid crystal device is used for displaying various pieces of information regarding an electronic apparatus as an image. In regard to this liquid crystal device, a wide viewing angle characteristic may be required or a narrow viewing angle characteristic may also be required.

When a large number of people view an image that is displayed on the liquid crystal device from multi-directions, a wide viewing angle is required. On the other hand, when a user does not want others to look in a display image while viewing the display image, a narrow viewing angle characteristic is required, for example, when viewing an image that is displayed on a cellular phone in a crowded place. To meet the above request, an existing liquid crystal device that can be used by switching between a wide viewing angle and a narrow viewing angle has been proposed.

For example, a liquid crystal device that adds a viewing angle control element, which is formed of a liquid crystal panel, to a display element, such as the liquid crystal device, has been known. The liquid crystal device is, for example, described in Japanese Unexamined Patent Application Publication No. 2004-361917, Japanese Unexamined Patent Application Publication No. 2005-275342, Japanese Unexamined Patent Application Publication No. 2006-064882, Japanese Unexamined Patent Application Publication No. 2006-072239, and Japanese Unexamined Patent Application Publication No. 2006-106439. The liquid crystal devices described in the above publications achieve a narrow viewing angle by darkening a display when a viewing angle control element is viewed from an inclined direction (that is, a direction in which a polar angle is large). In addition, an existing technology for switching between a wide viewing angle and a narrow viewing angle has been known, in which two types of light sources having different light diffusion properties or light directivity within a backlight, and a wide viewing angle and a narrow viewing angle are switched by switching those light sources.

Furthermore, in recent years, a configuration of a liquid crystal device has been proposed, in which viewing angle control pixels that are driven by a vertical electric field are assembled into display pixels of the liquid crystal panel of the liquid crystal device that employs a lateral electric field driving mode, which is typically represented by an IPS (In-Plain Switching) mode or an FFS (Fringe Field Switching) mode, which is, for example, described in H. S. Jin et al. "Novel Viewing-Angle Controllable TFT-LCD", SID (Society for Information Display) 06 DIGEST P-139 (hereinafter, referred to as Non-Patent Document 1).

In the liquid crystal device described in Non-Patent Document 1, by switching viewing angle control pixels between an on state and an off state, viewing angle control is performed for restricting an image display that is performed in a lateral electric field mode to a narrow viewing angle or allowing an image to be displayed as it is. This viewing angle control does not require another liquid crystal panel for viewing angle compensation in addition to a liquid crystal panel for display, and has advantage such that viewing angle compensation can be performed only by a single liquid crystal panel. However, in the above Non-Patent Document 1, it is necessary to provide electrodes respectively for a pair of substrates opposite each other in order to form a vertical electric field within the viewing angle control pixels and, therefore, there is a problem that an electrode structure and a wiring structure are complex in the pair of substrates. In addition, there is also a problem that an occurrence of assembly deviation when the pair of substrates are adhered should be strictly regulated.

SUMMARY

An advantage of some aspects of the invention is that it provides a liquid crystal device and an electronic apparatus that are configured to perform an image display on the basis of lateral electric field using display pixels provided between a pair of substrates while performing viewing angle control using viewing angle control pixels provided between the same substrates, and that is able to simplify an electrode structure and a wiring structure in the pair of substrates and, in addition, is able to increase an allowable error in assembly deviation between the pair of substrates.

An aspect of the invention provides a first liquid crystal device. The liquid crystal device includes a first substrate, a second substrate, a liquid crystal layer, a plurality of display pixels, and a plurality of viewing angle control pixels. The first substrate and the second substrate are opposed to each other. The liquid crystal layer is provided between the first substrate and the second substrate. The plurality of display pixels and the plurality of viewing angle control pixels are arranged in a planar region of the first substrate and second substrate to form a display area. Each of the display pixels and each of the viewing angle control pixels each drive the liquid crystal layer by electric field generated between a first electrode and a second electrode, both of which are provided on the first substrate. In each of the viewing angle control pixels, an initial alignment direction of liquid crystal molecules of the liquid crystal layer is placed along a direction of electric field generated between the first electrode and the second electrode, the direction of electric field being parallel to a surface of the first substrate.

According to the aspect of the invention, in each of the display pixels, the liquid crystal layer is driven by electric field, so called lateral electric field, generated between the first electrode and the second electrode, each of which are provided on the first substrate, which is a common substrate. For example, when an off voltage is applied, black display may be performed (that is, dark display), and, when an on voltage is applied, white display may be performed (that is, bright display). Then, by applying an on voltage to desired display pixels, it is possible to display a desired image. The white display, which is performed when an on voltage is applied, is achieved by controlling alignment of the liquid crystal molecules on the basis of lateral electric field, so that it exhibits wide viewing angle characteristic. That is, even when viewed from the front side or viewed from an oblique direction that is largely inclined (that is, from a direction of which a polar angle is large), white display may be recognized.

On the other hand, in each of the viewing angle control pixels, the initial alignment direction of the liquid crystal molecules is set along a direction of electric field, parallel to the surface of the first substrate, generated between the first electrode and the second electrode, that is, in each of the viewing angle control pixels, because the initial alignment direction of the liquid crystal molecules of the liquid crystal layer intersects with a direction in which linear electrode portions of the electrodes extend, it exhibits black display even when viewed from the front side or viewed from an oblique direction of which a polar angle is large when an off voltage is applied. On the other hand, it is possible to obtain such a display characteristic that, when an on voltage is applied, it remains black display when viewed from the front side and it appears white display at a specific polar angle position when viewed from an oblique direction. It would appear that, when an on voltage is applied to the viewing angle control pixel, alignment of the liquid crystal molecules between the substrates is changed from a direction substantially parallel to the substrates to a direction perpendicular to the substrates.

According to the above, when an off voltage is applied to the viewing angle control pixels while an image display is being performed by applying scanning signals and data signals to the plurality of display pixels, it is possible to realize wide viewing angle display using the display pixels. On the other hand, when an on voltage is applied to the viewing angle control pixels while wide viewing angle display is being performed using the display pixels on the basis of lateral electric field mode, an image display performed by the display pixels may be recognized from the front side without any restrictions; however, from a specific oblique direction in which white display is performed by the viewing angle control pixels, because white display is performed by the viewing angle control pixels, the contrast of display performed by the display pixels decreases and an image display then cannot be recognized. In this manner, it is possible to realize narrow viewing angle display in which an image display may be recognized from the front side but the image display cannot be recognized from a lateral direction. When a voltage applied to the viewing angle control pixels is controlled, it is possible to control white display in an oblique direction. Thus, the degree of viewing angle in an oblique direction may be adjusted.

As described above, according to the aspect of the invention, by switching or controlling a voltage applied to the viewing angle control pixels between an off state and an on state, it is possible to switch a display mode in the display area between wide viewing angle display and narrow viewing angle display. Because the above described viewing angle control may be obtained by the operation of the display pixels and viewing angle control pixels, which are provided between the pair of substrates, that is, obtained by a single liquid crystal panel, in comparison with the existing liquid crystal device that controls viewing angle using a plurality of liquid crystal panels, it is possible to give the function of viewing angle control to the liquid crystal device and the electronic apparatus provided with the liquid crystal device while maintaining their thin overall thickness.

In addition, according to the aspect of the invention, each of the viewing angle control pixels as well as each of the display pixels has a lateral electric field mode electrode structure, that is, a structure in which a pair of electrodes are provided on one of the substrates, and does not have a structure in which an electrode is provided on each of the pair of substrates. Thus, it is possible to simplify an electrode structure and a wiring structure in the pair of substrates and also possible to increase an allowable error in assembly deviation between the pair of substrates. Hence, it is possible to largely reduce defective liquid crystal device being manufactured.

Next, in the liquid crystal device according to the aspect of the invention, a holding capacitance of each of the display pixels may be equal to a holding capacitance of each of the viewing angle control pixels. This configuration may be, for example, achieved in such a manner that each display pixel and each viewing angle control pixel both have the same area in which the common electrode and the pixel electrode overlap each other in plan view. According to this configuration, an impedance of each display pixel and an impedance of each viewing angle control pixel may be made equal, so that it is possible to make it easy to control driving of both pixels.

Next, in the liquid crystal device according to the aspect of the invention, liquid crystal that constitutes the liquid crystal layer may have a positive anisotropy of dielectric constant, wherein any one of the first electrode and the second electrode of each of the display pixels may have a plurality of linear electrode portions that are arranged parallel to one another with gaps formed between the adjacent linear electrode portions, and wherein a direction in which the linear electrode portions extend may fall within an inclination angle range of 0° to ±45° relative to a longitudinal direction of the display pixels. The aspect of the invention assumes that, when positive liquid crystal is used as the liquid crystal, the linear electrode portions of each pixel electrode (hence, groove-like gaps adjacent thereto) each have a shape extending in a longitudinal direction of the display pixels, that is, a longitudinal stripe shape.

The longitudinal direction of the display pixels is, for example, a vertical direction of the display area or a top to bottom direction of an image displayed in the display area. Each of the pixels that constitute the display area generally has a rectangular shape, and the vertical direction of the display area generally coincides with the longitudinal direction of the pixels. In addition, the display area is normally formed of a plurality of pixels (here, sub-pixels) that are arranged in a matrix in a scanning direction, which is a direction of pixel columns, to which scanning signals are sequentially supplied, and an auxiliary scanning direction that intersects with the scanning direction, and the longitudinal direction of the display pixels is generally the same direction as the auxiliary scanning direction that intersects with the scanning direction.

Next, in the liquid crystal device according to the aspect of the invention, the initial alignment direction of the liquid crystal molecules may be 0° to 15° relative to the direction in which the linear electrode portions extend within each of the display pixels. With this configuration, by controlling a voltage applied between the first electrode and the second electrode within each of the display pixels, it is possible to accurately drive the liquid crystal molecules.

Next, in the liquid crystal device according to the aspect of the invention, a pigmented film of a predetermined color may be provided in each of the display pixels, and a pigmented film may not be provided in each of the viewing angle control pixels. When the pigmented film is provided in each of the display pixels, it is possible to perform a color image display through the control of a lateral electric field mode using the display pixels. By not providing a pigmented film in each of the viewing angle control pixels, when the viewing angle control pixels are made into an on state, it is possible to recognize colorless bright display when the display area is viewed from a lateral oblique direction of which a polar angle is large. This is suitable for decreasing the contrast of an image displayed by the display pixels when viewed from an oblique direction during narrow viewing angle display.

Next, in the liquid crystal device that uses the pigmented film according to the aspect of the invention, the plurality of display pixels may be formed so that sub-pixels of multiple colors are grouped to form a unit pixel, wherein a plurality of the unit pixels may be arranged to form the display area, and wherein each of the viewing angle control pixels may be provided for each of the unit pixels formed of the display pixels. In this configuration, the number of viewing angle control pixels is larger than the number of display pixels, and this configuration is effective when an image formed by the display pixels is bright, that is, for example, when an NTSC rate is small or when a resolution is low.

Next, in the liquid crystal device that uses the pigmented film according to the aspect of the invention, the plurality of display pixels may be formed so that pixels of multiple colors are grouped to form a unit pixel set, wherein a plurality of the unit pixel sets may be arranged to form the display area, and wherein each of the viewing angle control pixels may be provided for every two unit pixel sets formed of the display pixels. In this configuration, the number of viewing angle control pixels is smaller than the number of display pixels, and this configuration is effective when an image formed by the display pixels is dark, that is, for example, when an NTSC rate is large or when a resolution is high.

Next, in the liquid crystal device that uses the pigmented film according to the aspect of the invention, the unit pixel formed of the display pixels may be formed of sub-pixels that respectively have pigmented films of multiple colors, wherein the sub-pixels may be arranged in a stripe such that the same colors are arranged in a first direction, which is a longitudinal direction of the display pixels, and different colors are arranged in a second direction perpendicular to the first direction, and wherein each of the viewing angle control pixels may be provided between one unit pixel formed of the display pixels and another unit pixel adjacent to the one unit pixel in the second direction. According to the above configuration, it is possible to simplify the structure of arrangement of the plurality of display pixels and the plurality of viewing angle control pixels. In addition, in comparison with a structure in which each of the viewing angle control pixels is associated with each of the plurality of display pixels, it is possible to maintain a high aperture ratio.

Note that the pigmented regions of multiple colors, such as R (red), G (green), B (blue), and the like, are formed so that, within a visible light range (380 nm to 780 nm) in which a hue varies with a wavelength, "R" is a pigmented region of red hue series, "G" is a pigmented region of green hue series and "B" is a pigmented region of blue hue series. For example, "B" is a pigmented region having a peak wavelength of 415 nm to 500 nm, "G" is a pigmented region having a peak wavelength of 485 nm to 535 nm and "R" is a pigmented region having a peak wavelength of 600 nm or above. Of course, the aspect of the invention does not limit the pigmented regions, so that, where necessary, another given wavelength region may be selected and, moreover, where necessary, pigmented films of Y (yellow), M (magenta), C (cyan), EG (emerald green), other than R, G, B, may be combined.

Next, in the liquid crystal device that uses the pigmented film according to the aspect of the invention, the unit pixel formed of the display pixels may be formed of sub-pixels that respectively have pigmented films of three colors of R (red color), G (green color), B (blue color), wherein the sub-pixels of two colors among the three colors may be arranged adjacent to each other in a longitudinal direction of the display pixels, wherein the sub-pixel of the remaining one color among the three colors may be arranged adjacent to any one of the sub-pixels of the two colors in a direction perpendicular to the longitudinal direction, and wherein each of the viewing angle control pixels may be arranged adjacent to the sub-pixel of the remaining one pixel in the longitudinal direction. According to this configuration, because each of the viewing angle control pixels is located at a position adjacent to all the R, G, B display pixels, although only one viewing angle control pixel is provided for each unit pixel that is formed of three R, G, B display pixels, it is possible to effectively perform viewing angle control using the viewing angle control pixel over display that is performed by three display pixels.

Next, in the liquid crystal device according to the aspect of the invention, a total area of the unit pixel formed of the display pixels may be larger than a total area of each of the viewing angle control pixels. According to this configuration, it is possible to make an image display be bright by the display pixels while sufficiently achieving viewing angle control effect.

Next, in the liquid crystal device according to the aspect of the invention, the first electrode and the second electrode, formed within each of the display pixels, each may have a plurality of linear electrode portions that are arranged parallel to one another with gaps formed between the adjacent linear electrode portions, wherein, where an interval between an end side of each of the linear electrode portions of the first electrode and an opposite end side of each of the linear electrode portions of the second electrode is $D_0$ and a thickness of the liquid crystal layer is $D_1$, $D_1$ may be larger than $D_0$. In this configuration, both the first electrode and the second electrode, which form lateral electric field, each have the linear electrode portions, and the configuration is regulated so that an interval between each of the linear electrode portions of the first electrode and a corresponding one of the opposite linear electrode portions of the second electrode is set smaller than the thickness of the liquid crystal layer. This configuration regulates an FFS mode among lateral electric field modes. The FFS mode liquid crystal device, different from the IPS mode liquid crystal device, is able to form electric field in a region immediately above the first electrode and the second electrode, so that it is possible to display a bright and clear image.

Next, in the liquid crystal device according to the aspect of the invention, the first electrode formed within each of the display pixels may have a plurality of linear electrode portions that are arranged parallel to one another with gaps formed between the adjacent linear electrode portions, wherein the second electrode formed within each of the display pixels may be a planar electrode that does not have a gap. This regulates a configuration in which one of the first electrode and the second electrode, which form lateral electric field, is a stripe electrode having linear electrode portions, and the other is a planar (so-called solid) electrode. When viewed from another side, it is conceivable that this configuration is an electrode structure in which an interval between each of the linear electrode portions of the first electrode and a corresponding one of the opposite linear electrode portions of the second electrode is 0 (zero). In this configuration as well, the interval between each of the linear electrode portions of the first electrode and a corresponding one of the opposite linear electrode portions of the second electrode is set smaller than the thickness of the liquid crystal layer, so that this configuration regulates an FFS mode among lateral electric field modes. The FFS mode liquid crystal device, different from the IPS mode liquid crystal device, is able to form electric field in a region immediately above the first electrode and the second electrode, so that it is possible to display a bright and clear image.

Next, in the liquid crystal device according to the aspect of the invention, the first substrate may have a first polarizer, and the second substrate may have a second polarizer, wherein liquid crystal alignment direction of the first substrate and liquid crystal alignment direction of the second substrate may be antiparallel to each other, wherein a polarization axis of the first polarizer and a polarization axis of the second polarizer may be perpendicular to each other, and wherein one of the polarization axis of the first polarizer and the polarization axis of the second polarizer may be parallel to the liquid crystal alignment directions. This aspect of the invention regulates relationship in optical axis between the polarizers, used in the aspect of the invention, and the liquid crystal alignment directions. By regulating the relationship in optical axis as in the case of the aspect of the invention, it is possible to accurately perform viewing angle control.

Next, in a second liquid crystal device according to the aspect of the invention, a pigmented film of a predetermined color may be provided in each of the display pixels, wherein a pigmented film of the same color but lighter than the color of the pigmented film used in a unit pixel formed of the display pixels adjacent to the viewing angle control pixel may be provided in each of the viewing angle control pixels.

The second liquid crystal device differs from the above first liquid crystal device in that, in the first liquid crystal device, no pigmented film is provided in each of the viewing angle control pixels, whereas, in the second liquid crystal device, a pigmented film of the same color but lighter than the color of the pigmented film used in the display pixel adjacent to the viewing angle control pixel is provided in each of the viewing angle control pixels. That is, in the first liquid crystal device, no pigmented film is provided in each of the viewing angle control pixels, whereas, in the second liquid crystal device, a pigmented film of a lighter color is provided in each of the viewing angle control pixels. Because a pigmented film is also provided in each of the viewing angle control pixels, it is not necessary to specially arrange a white or transparent pigmented film in each of the viewing angle control pixels and, therefore, it is advantageous in terms of manufacturing costs. In addition, when viewing angle control is performed in a specific oblique direction, instead of performing white display by the viewing angle control pixels, color display is performed by the pigmented films, so that it is possible to adjust the contrast. Color display when viewed from an oblique direction may be selected in accordance with display colors used in a color image.

Next, in a third liquid crystal device according to the aspect of the invention, a pigmented film of a predetermined color may be provided in each of the display pixels, wherein a pigmented film having the same color of a pigmented film used in a unit pixel formed of the display pixels adjacent to the viewing angle control pixel but partly having a non-pigmented region may be provided within each of the viewing angle control pixels.

The third liquid crystal device differs from the second liquid crystal device in that, in the second liquid crystal device, a pigmented film of the same color but lighter than the color of a pigmented film used in the display pixels adjacent to the viewing angle control pixel is provided in each of the viewing angle control pixels, whereas, in the third liquid crystal device, a pigmented film having the same characteristic used as a pigmented film in the display pixels adjacent to the viewing angle control pixel but partly having a non-pigmented region is provided in each of the viewing angle control pixels. That is, in the second liquid crystal device, a pigmented film having a uniform color depth is provided in each of the viewing angle control pixels, whereas, in the third liquid crystal device, a region at which a pigmented film is removed is provided in each of the viewing angle control pixels. According to this configuration, when viewing angle control is performed in an oblique direction, white display and color display may be adjusted by the viewing angle control pixels, and the contrast in an oblique direction may be fine adjusted.

Next, an aspect of the invention provides an electronic apparatus that includes the above configured liquid crystal device. The liquid crystal device according to the aspect of the invention, when performing viewing angle control between wide viewing angle display and narrow viewing angle display, is able to perform viewing angle control using a single liquid crystal panel without using multiple liquid crystal panels being overlapped, it is possible to maintain the thin overall thickness liquid crystal device. Thus, in the electronic apparatus of the aspect of the invention, using the above described liquid crystal device as well, without increasing the thickness of the electronic apparatus, it is possible to implement viewing angle control.

BRIEF DESCRIPTION OF THE DRAWINGS

The invention will be described with reference to the accompanying drawings, wherein like numbers reference like elements.

FIG. 8A is a cross-sectional view of an electrode structure of a liquid crystal device according to an alternative embodiment when an electrode interval $D_0$ is not zero, and FIG. 8B is a cross-sectional view of an electrode structure of a liquid crystal device according to an alternative embodiment when the electrode interval $D_0$ is zero.

DESCRIPTION OF EXEMPLARY EMBODIMENTS

First Embodiment of Liquid Crystal Device

Figure 1:
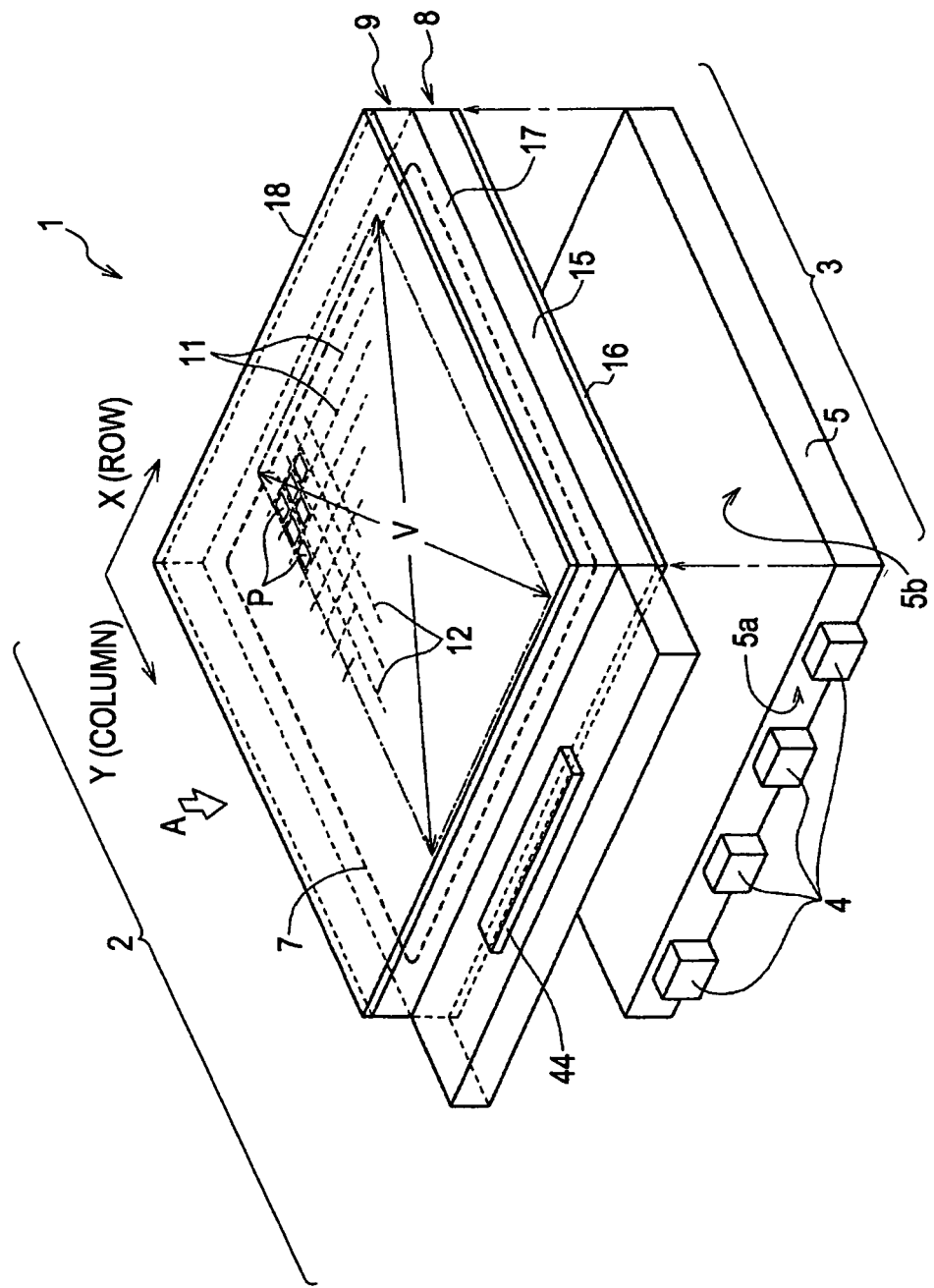
FIG. 1 is a perspective view that shows one embodiment of a liquid crystal device according to the invention.

Hereinafter, an embodiment of the invention will be described by taking a case where the invention is applied to an transmissive active matrix mode liquid crystal device, which is able to perform color display, as an example of a liquid crystal device. In addition, in the present embodiment, the aspects of the invention are applied to a liquid crystal device that uses a channel-etch-type single gate polysilicon TFT elements as switching elements. In addition, in the liquid crystal device of the present embodiment, an FFS (Fringe Field Switching) mode, which is one of lateral electric field driving mode, is employed. Needless to say, the aspects of the invention are not limited to this embodiment. Furthermore, in the drawings used in the following description, dimensions of a plurality of components may be varied from an actual ratio thereof for the purpose of easier understanding of characterized portions.

FIG. 1 is a perspective view that shows one embodiment of a liquid crystal device according to the invention. As shown in FIG. 1, the liquid crystal device 1 includes a liquid crystal panel 2 and a lighting device 3. In regard to the liquid crystal device 1, the side indicated by the arrow A is a viewing side, and the above described lighting device 3 is arranged on a side opposite to the viewing side with respect to the liquid crystal panel 2, and functions as a backlight. The lighting device 3 includes an LED (Light Emitting Diode) 4, which serves as a light source, and a light guide 5 formed of transparent resin. Light emitted from the LED 4 is introduced into the light guide 5 from a light incidence plane 5a of the light guide 5 and is supplied from a light exit plane 5b to the liquid crystal panel 2 in the form of planar light. The lighting device 3 may be the one that does not use a point light source, such as the LED 4 but uses a line light source, such as a cold-cathode tube.

The liquid crystal panel 2 includes an element substrate 8, which serves as a first substrate, and a color filter substrate 9, which serves as a second substrate, both of which are adhered to each other through a rectangular or quadratic and annular (that is, frame-shaped) seal material 7 as viewed in the direction indicated by the arrow A. The element substrate 8 is an element substrate on which switching elements are formed.

The color filter substrate 9 is a color filter substrate on which color filters are formed. In the present embodiment, the color filter substrate 9 is arranged on the viewing side, and the element substrate 8 is arranged on a rear side as viewed from the viewing side. The seal material 7 is, for example, formed of thermosetting or ultraviolet curing resin, such as epoxy-based resin, and is formed into a desired annular shape by, for example, screen printing.

In a region surrounded by the seal material 7 within the liquid crystal panel 2, a plurality of mutually parallel scanning lines 11 are provided so as to extend in a row direction X. In addition, a plurality of mutually parallel signal lines 12 are provided so as to extend in a column direction Y. A plurality of dot-like (that is, island-like) regions surrounded by the plurality of scanning lines 11 and the plurality of signal lines 12 are arranged in a matrix as viewed from the direction indicated by the arrow A. Then, a sub-pixel P is provided in each of these regions. These sub-pixels P are arranged in a matrix to form a display area V. Note that FIG. 1 is a schematic view of the sub-pixels P that are enlarged from the size of the actual sub-pixels. The row direction X and the column direction Y respectively correspond to a horizontal direction and a vertical direction when a viewer views an image displayed on the liquid crystal panel 2.

Each of the sub-pixels P is a region that becomes a unit of switching between bright display (white display) and dark display (black display), and a unit pixel (hereinafter, referred to as a pixel set or a set, where appropriate) that becomes a unit of display is formed of the plurality of sub-pixels P grouped together. For example, the sub-pixel P is formed in correspondence with each of colors of R (red color), G (green color), B (blue color), and a unit pixel is formed so that three sub-pixels P corresponding to three colors of R, G, B are grouped together. In addition, a unit pixel may possibly be formed so that four color sub-pixels P including additional one color (for example, blue-green) in addition to three colors of R, G, and B are grouped together. In the present embodiment, a unit pixel is formed of sub-pixels of three colors R, G, B.

Note that, in the present embodiment, a desired image is displayed by pixel sets, each of which is formed of grouped sub-pixels P corresponding to colors of R, G, B, and other sub-pixels P are associated with the pixel sets and then viewing angle control is performed by those associated sub-pixels P. In the specification, each of the three sub-pixels P that constitute each pixel set is termed as "display pixel Pa", and the additional sub-pixel P for performing viewing angle control is termed as "viewing angle control pixel Pb". The viewing angle control is a control that realizes a wide viewing angle (a state in which a viewing angle is wide) when the liquid crystal panel 2 (see FIG. 1) is viewed from the front side and realizes a narrow viewing angle (a state in which a viewing angle is narrow) when the liquid crystal panel 2 is viewed in an obliquely inclined direction.

Figure 2:
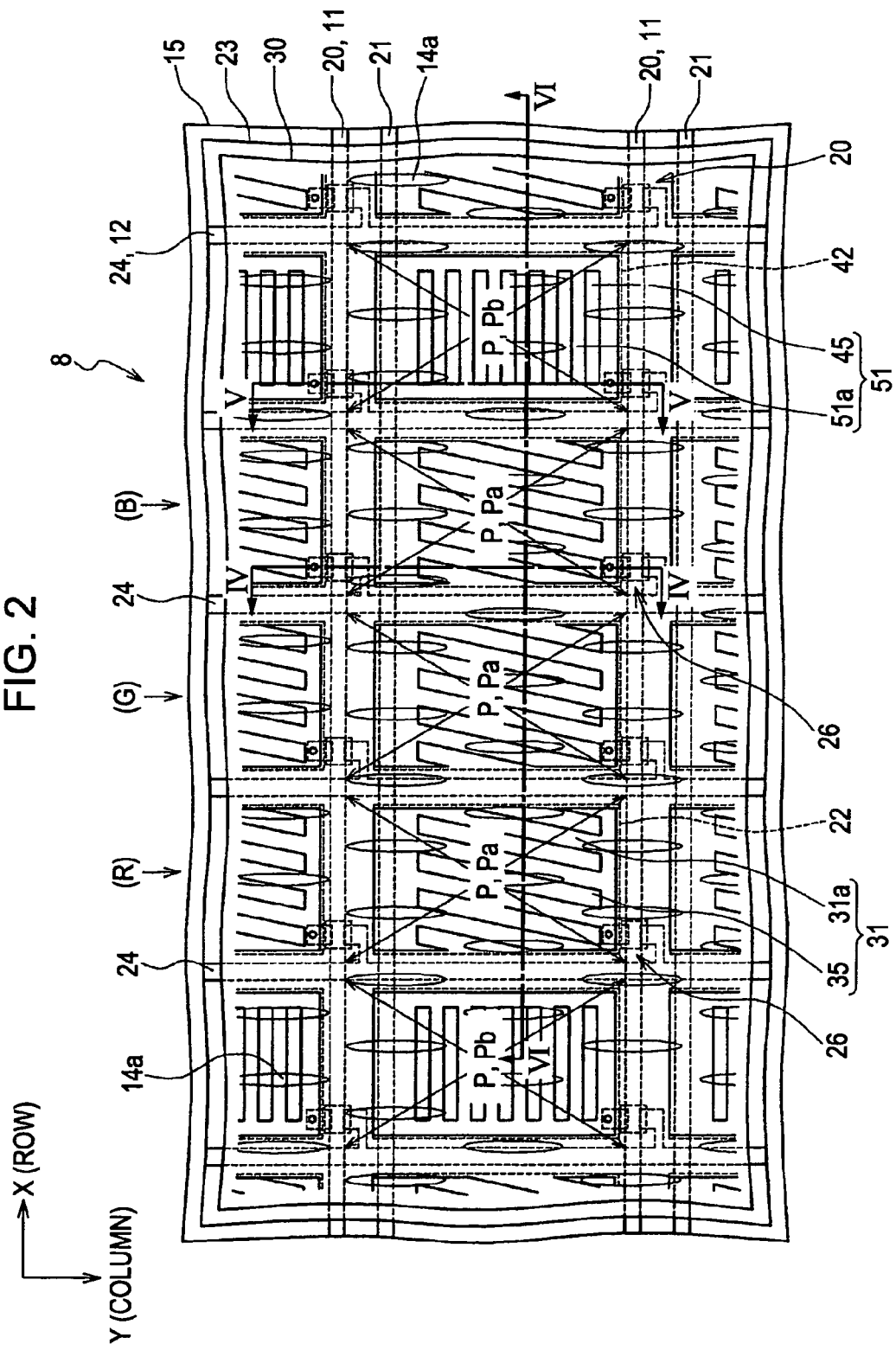
FIG. 2 is a plan view that shows a pixel set and its neighborhood on one substrate that constitutes the liquid crystal device shown in FIG. 1.
Figure 3:
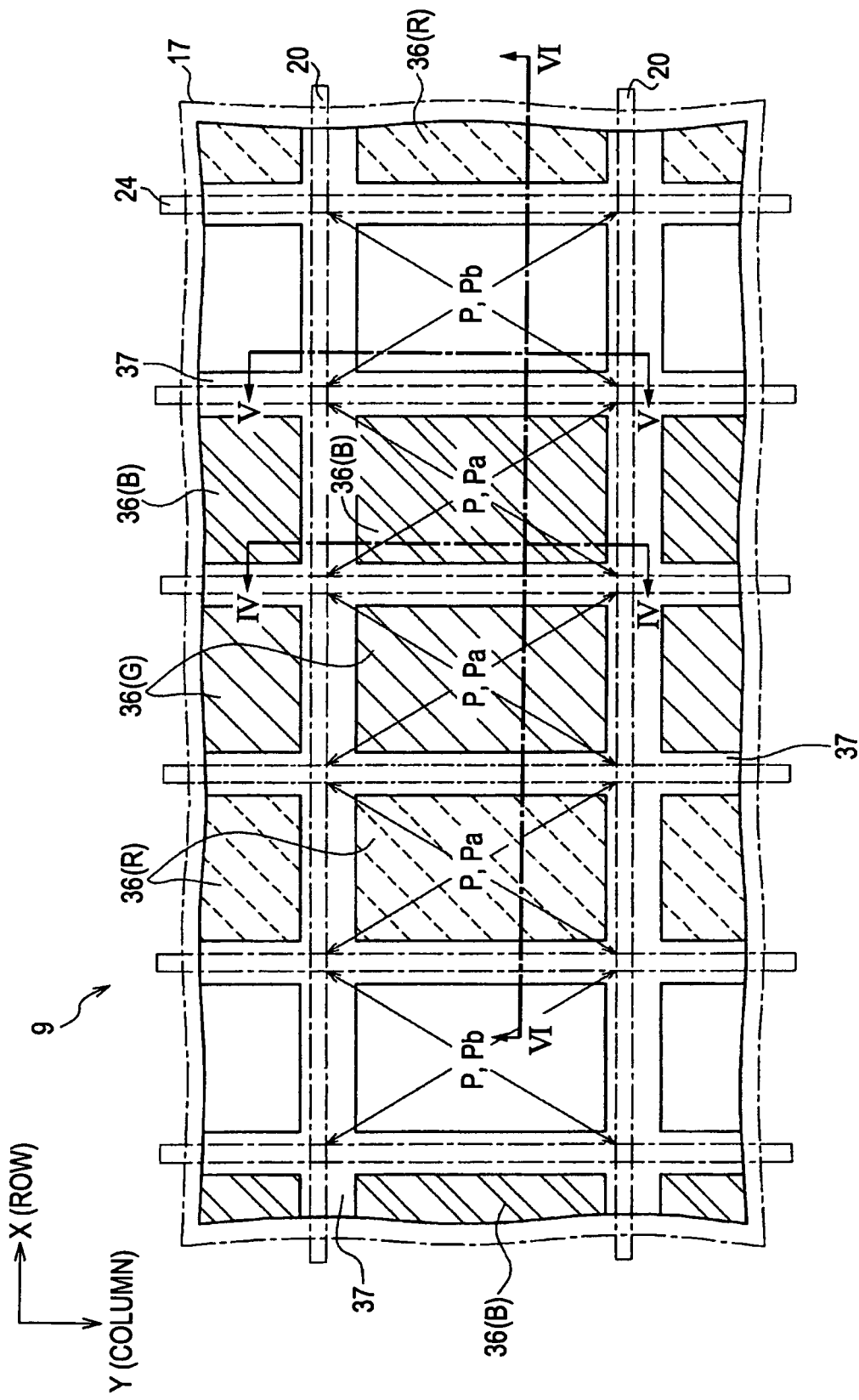
FIG. 3 is a plan view that shows a pixel set and its neighborhood on the other substrate that constitutes the liquid crystal device shown in FIG. 1.
Figure 4:
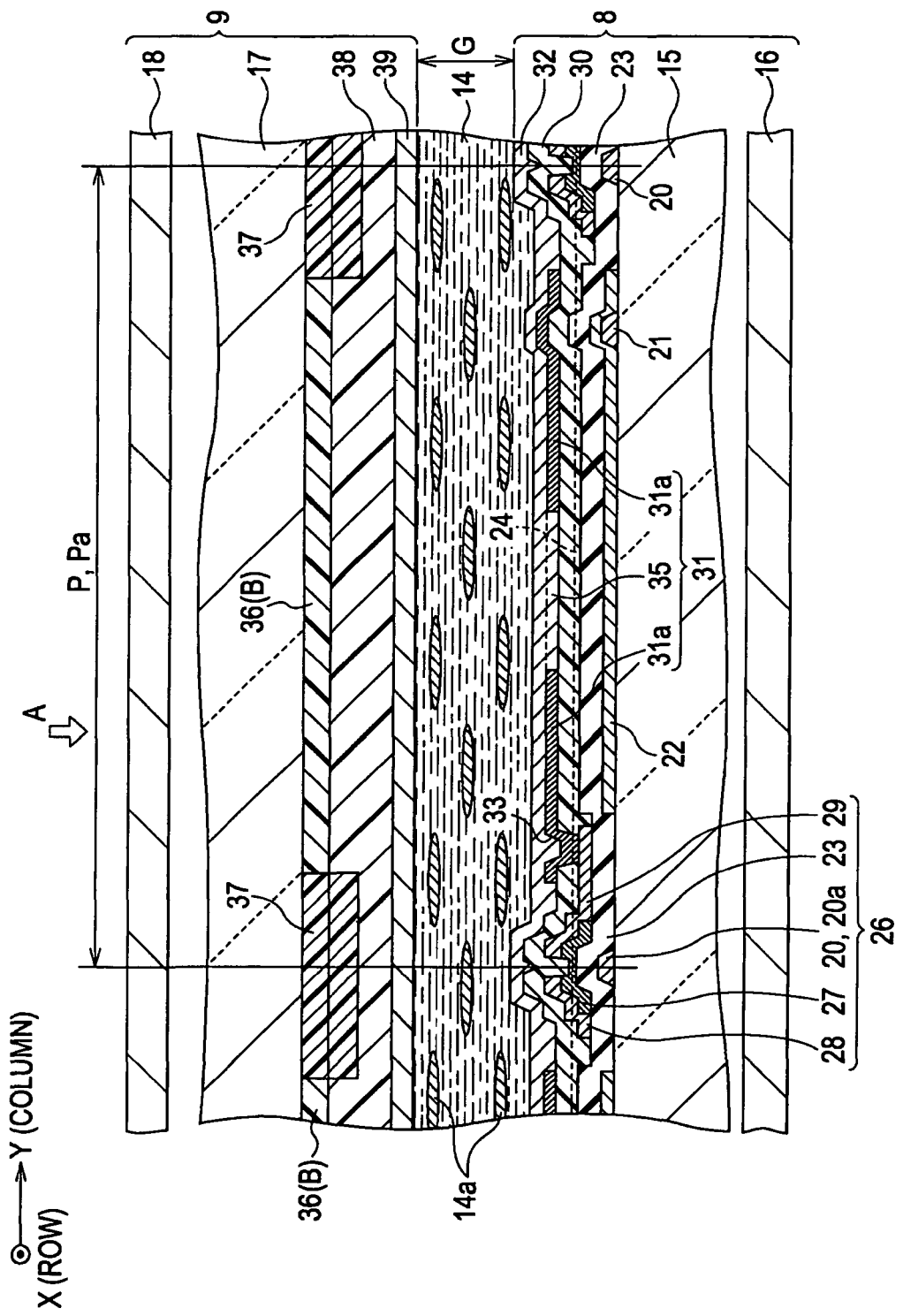
FIG. 4 is a cross-sectional view of a display pixel along a column direction, taken along the line IV-IV in FIG. 2 and FIG. 3.
Figure 5:
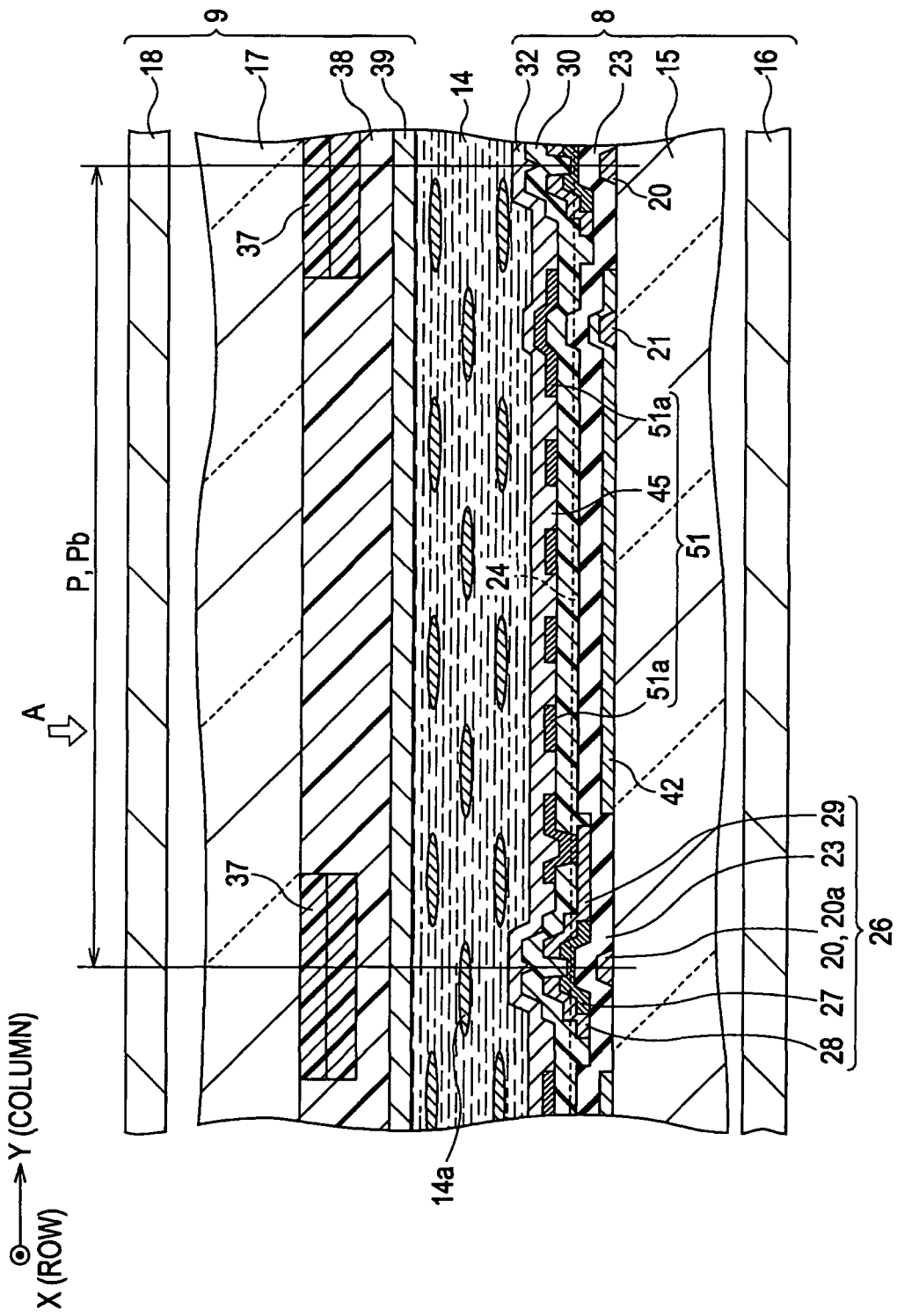
FIG. 5 is a cross-sectional view of a viewing angle control pixel along a column direction, taken along the line V-V in FIG. 2 and FIG. 3.
Figure 6:
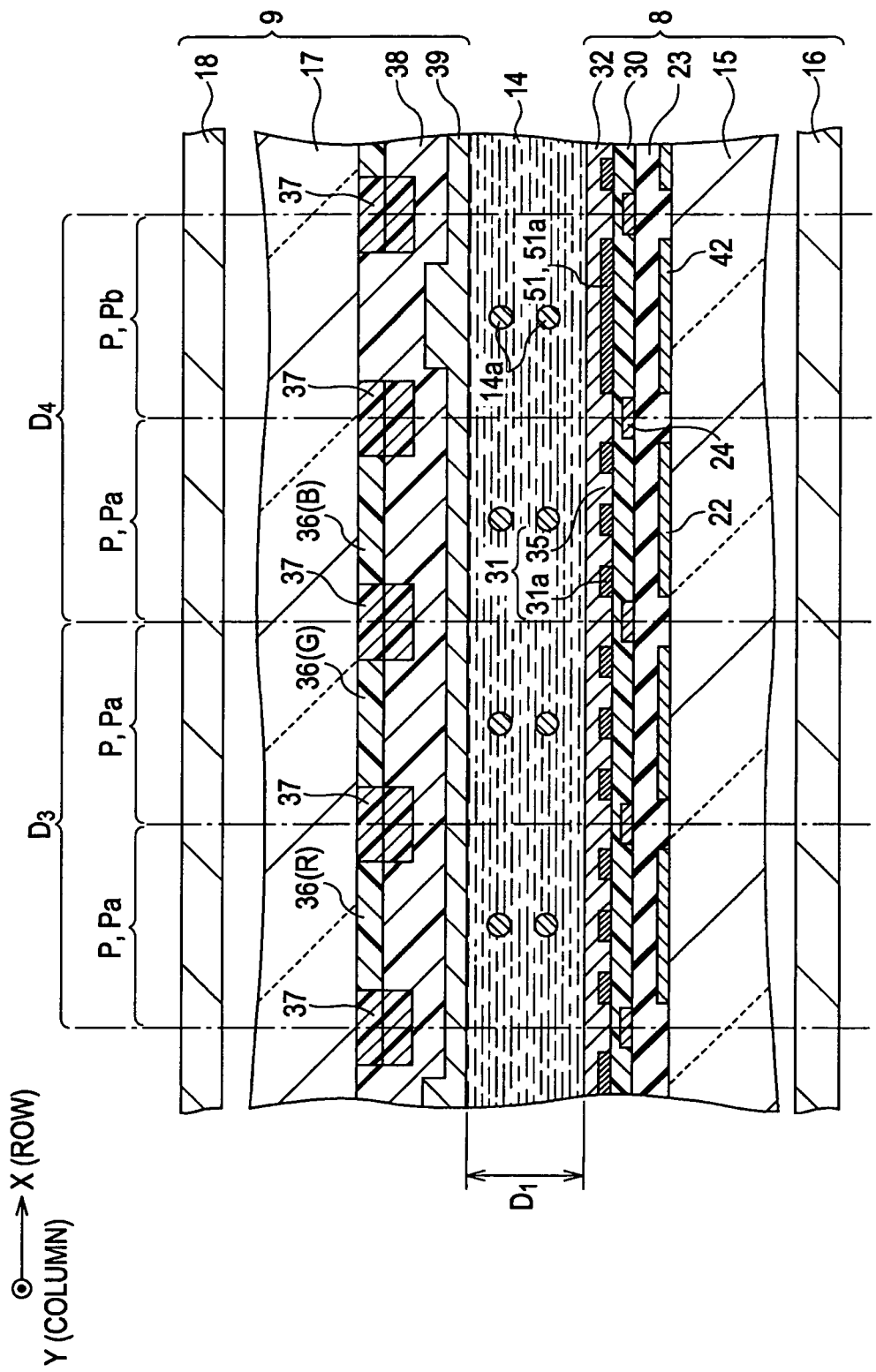
FIG. 6 is a cross-sectional view of a pixel set and its neighborhood along a row direction, taken along the line VI-VI in FIG. 2 and FIG. 3.

FIG. 2 is a plan view that shows a pixel (pixel set) and its neighborhood on the element substrate 8 shown in FIG. 1 as viewed from the direction indicated by the arrow A. FIG. 3 is a plan view that shows a pixel set and its neighborhood on the color filter substrate 9 shown in FIG. 1 as viewed from the direction indicated by the arrow A. FIG. 4 is a cross-sectional view of a sub-pixel P (particularly, a display pixel Pa), taken along the line IV-IV in FIG. 2 and FIG. 3. FIG. 5 is a cross-sectional view of a sub-pixel P (particularly, a viewing angle control pixel Pb), taken along the line V-V in FIG. 2 and FIG. 3. FIG. 6 is a cross-sectional view of a pixel set and a viewing angle control pixel along the row direction X, taken along the line VI-VI in FIG. 2 and FIG. 3.

As shown in FIG. 1, a gap having a predetermined thickness, that is, a so-called cell gap, is formed between the element substrate 8 and the color filter substrate 9. The thickness of this cell gap is maintained by gap material contained in the seal material 7 and a spacer (not shown) placed on the surface of the element substrate 8 or on the surface of the color filter substrate 9. The spacer may be formed by dispersing spherical members on the element substrate 8 or on the color filter substrate 9 or may be formed on the element substrate 8 or on the color filter substrate 9 by means of photolithography process. The thus formed cell gap is shown in FIG. 4 with the reference sign G. A liquid crystal layer 14 is formed by injecting liquid crystal into the cell gap G. In the present embodiment, nematic liquid crystal that has a positive anisotropy of dielectric constant ($\Delta\epsilon > 0$) is used as the liquid crystal. The reference numeral 14a indicates schematic liquid crystal molecules 14a contained in the liquid crystal. In the present embodiment, an initial alignment of the liquid crystal molecules 14a is set parallel to the element substrate 8 and the color filter substrate 9. Note that, herein, the parallel also means a case where the liquid crystal molecules have a predetermined pretilt angle relative to the substrates.

The element substrate 8 has a rectangular or quadratic first transparent substrate 15 as viewed from the direction indicated by the arrow A. The first transparent substrate 15 is, for example, formed of transparent glass, transparent plastic, or the like. A first polarizer 16 (see FIG. 1) is adhered on an outer surface of the first transparent substrate 15. On the other hand, the color filter substrate 9 has a rectangular or quadratic second transparent substrate 17 as viewed from the direction indicated by the arrow A. The second transparent substrate 17 is, for example, formed of transparent glass, transparent plastic, or the like. A second polarizer 18 (see FIG. 1) is adhered on an outer surface of the second transparent substrate 17.

Next, film components that are formed respectively on the inner surfaces (surfaces adjacent to the liquid crystal) of the first transparent substrate 15 and second transparent substrate 17 will be described. In the present embodiment, the film components formed in each of the display pixels Pa shown in FIG. 2 are different from those formed in each of the viewing angle control pixels Pb shown in FIG. 3. Hereinafter, the film components will be described for each sub-pixel.

Configuration Formed on Element Substrate 8 within Display Pixel Pa

First, with reference to FIG. 2, FIG. 4, and FIG. 6, the film components formed on the first transparent substrate 15 within the display pixel Pa in regard to the element substrate 8 will be described. As shown in FIG. 4, gate lines 20 and common lines 21 are provided on the inner surface (that is, the surface adjacent to the liquid crystal) of the first transparent substrate 15. As shown in FIG. 2, the plurality of gate lines 20 are formed parallel to one another so as to extend in the row direction X. The plurality of common lines 21 are formed parallel to the gate lines 20 so as to extend in the row direction X. The gate lines 20 function as the scanning lines 11 shown in FIG. 1.

Figure 7:
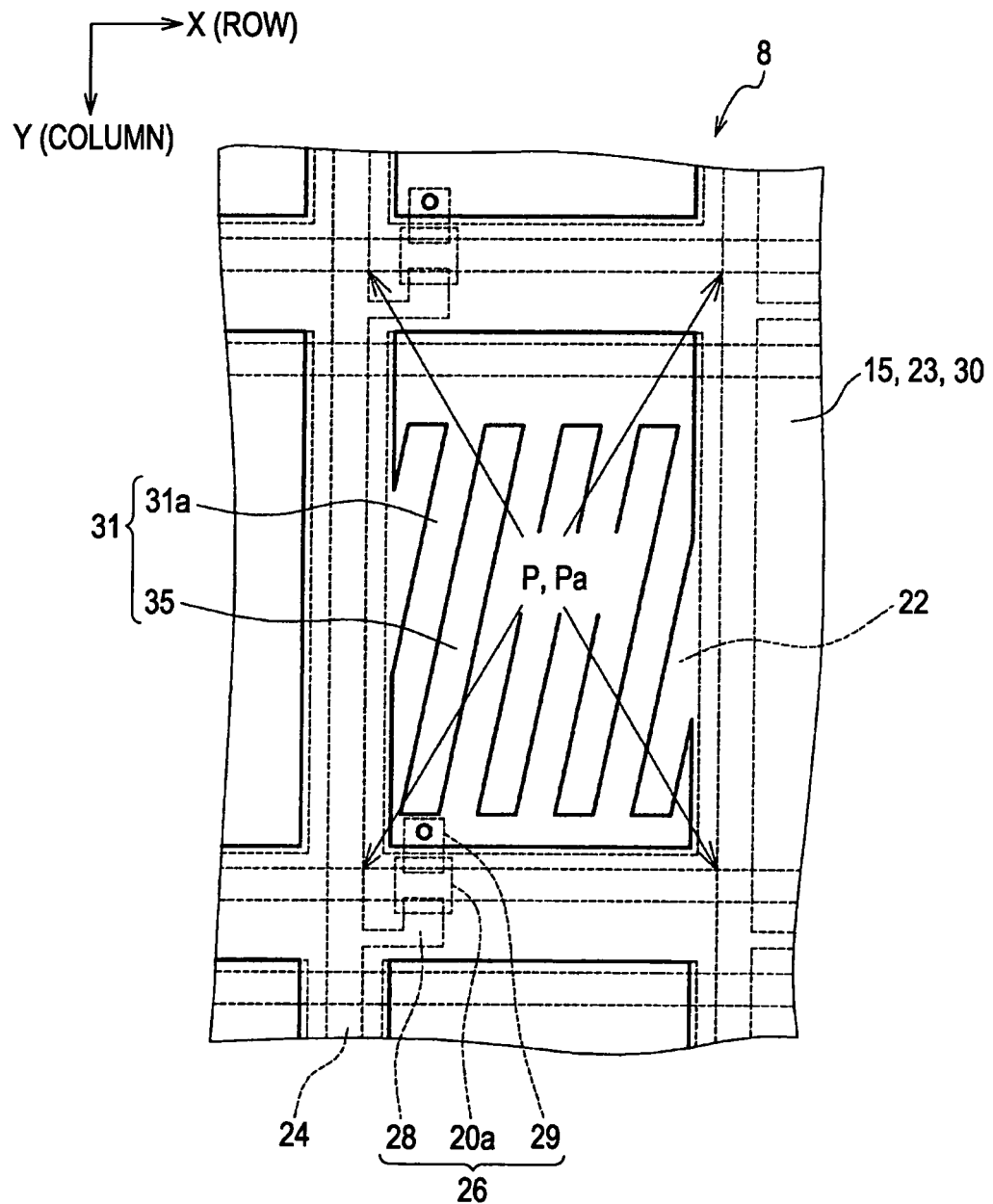
FIG. 7 is an enlarged plan view of a sub-pixel shown in FIG. 2.

Between the adjacent gate lines 20 on the first transparent substrate 15, as shown in FIG. 7, a substantially rectangular and planar (so-called solid) common electrode 22 is provided one for each display pixel Pa as a second electrode. Each of the common electrodes 22 is partly formed to overlap the corresponding common line 21, as shown in FIG. 4, and, thereby, electrical conduction between each common electrode 22 and the corresponding common line 21 is established.

A gate insulating film 23, which is a planar resin film, is formed on the gate lines 20, the common lines 21 and the common electrodes 22 so as to cover them, and source lines 24 are formed on the gate insulating film 23 so as to extend in the column direction Y. The source lines 24 function as the signal lines 12 shown in FIG. 1. In FIG. 2, rectangular regions surrounded by the gate lines 20 and the source lines 24 are regions of the display pixels Pa as the sub-pixels P. In the present embodiment, color display is performed using three colors of R (red color), G (green color), B (blue color). Each of the display pixels Pa is a unit pixel corresponding to each color. A single pixel (pixel set), which is a unit of display, is formed of grouped three display pixels Pa corresponding to three colors arranged in the row direction X. In FIG. 2, the reference signs (R), (G), (B) indicate that red color display pixels Pa, green color display pixels Pa, and blue color display pixels Pa each are arranged in a line in the column direction.

In FIG. 2, a TFT (Thin Film Transistor) element 26, which is an active element that functions as a switching element, is provided in proximity to each of intersections of the gate lines 20 and the source lines 24. Each of the TFT elements 26 is formed as a channel-etch type polysilicon TFT having a bottom gate and single gate structure. As shown in FIG. 4, each TFT element 26 includes a gate electrode 20a, which is part of the gate line 20, a gate insulating film 23, a semiconductor film 27 formed of polysilicon, a source electrode 28, and a drain electrode 29. The source electrode 28 and the drain electrode 29 are electrode terminals of the TFT element 26, which serves as a switching element. As shown in FIG. 7, the source electrode 28 is formed by branching out from the source line 24. The TFT element 26 of the present embodiment has a bottom gate structure; however, it may have a top gate structure.

As shown in FIG. 4, a passivation film 30, which serves as a protection film, is formed of a planar resin film for covering the TFT elements 26 and the source lines 24 and is provided on the gate insulating film 23. The passivation film 30 is, for example, formed of photosensitive resin. Pixel electrodes 31, which serve as first electrodes, are provided on the passivation film 30, and an alignment layer 32 is provided on the pixel electrodes 31. In FIG. 2, the alignment layer 32 is not shown in the drawing. As shown in FIG. 4, in an upper region of the drain electrode 29 of the TFT element 26, a through-hole 33 is formed in the passivation film 30, and the pixel electrode 31 and the drain electrode 29 are conducted with each other through the through-hole 33.

In the present embodiment, as shown in FIG. 7, the source line 24 is a signal line, from which the source electrode 28 of the TFT element 26 extends, and the drain electrode 29 of the TFT element 26 is connected to the pixel electrode 31. Instead of this structure, it may be configured so that an electrode connected to the source line 24 serves a drain electrode and an electrode connected to the pixel electrode 31 serves a source electrode.

In FIG. 4, the common electrode 22, which serves as the second electrode, and the pixel electrode 31, which serves as the first electrode, are formed of transparent metal oxide, such as ITO (Indium Tin Oxide). The passivation film 30 and the gate insulating film 23 each function as an interlayer insulating film provided between the common electrodes 22 and the pixel electrode 31, and also function as an overcoat layer which is a resin film that covers other components. The passivation film 30 and the gate insulating film 23 are, for example, formed of acrylic resin, SiN (silicon nitride), or $SiO_2$ (silicon oxide). The alignment layer 32 is, for example, formed of polyimide.

As shown in FIG. 7, each of the pixel electrodes 31 is formed into a rectangular and planar shape corresponding to the display pixel Pa, which serves as the sub-pixel, and has a plurality of slits, that is, gaps 35, which are inclined obliquely. Each of the gaps 35 is a groove-like opening that extends through the pixel electrode 31, and the passivation film 30, which is a lower layer of the pixel electrode 31, may be seen through the gap 35. In addition, the plurality of gaps 35 are provided parallel to one another along the column direction Y and spaced apart from one another in a state where the upper ends of the gaps 35 are inclined to the right side in the row direction X. Strip-shaped linear electrode portions 31a are formed between the adjacent gaps 35. The gaps 35 and the linear electrode portions 31a are schematically shown in the drawing of the specification and the actual number of those components may be different from the ones shown in the drawing.

The gaps 35 and the linear electrode portions 31a extend in the column direction Y and, therefore, angles that both the gaps 35 and the linear electrode portions 31a make with the column direction Y (that is, a vertical direction or top to bottom direction of the display area, or the source lines 24) range from 0° to ±45°.

In the present embodiment, both short sides of each gap 35 are closed; however, one of both short sides of each gap 35 may be open. In the case where, one of both short sides of each gap 35 is open, the plurality of linear electrode portions 31a each become like a cantilever, and the plurality of linear electrode portions 31a are comb-shaped as a whole. Furthermore, both the short sides of each gap 35 may be open. In the present embodiment as described above, both the common electrodes 22 and the pixel electrodes 31, which are pair of electrodes, are formed on the element substrate 8, which is one of the substrates, in the display pixels Pa. Parallel electric field, which is so-called lateral electric field, will be formed on the surface of the element substrate 8 by applying a predetermined voltage between both electrodes. Owing to the lateral electric field, alignment of the liquid crystal molecules 14a in the liquid crystal layer 14 is controlled within a lateral plane.

FIG. 8A and FIG. 8B are cross-sectional views that show electrode structures formed of the pixel electrode 31 and the common electrode 22 shown in FIG. 6 according to alternative embodiments. In the embodiment shown in FIG. 6, each of the common electrodes 22 is formed as a planar electrode, whereas, in FIG. 8A and FIG. 8B, the common electrode 22 as well as the pixel electrode 31 formed in a stripe with the linear electrode portions 22a and the gaps 35 in combination. In both the alternative embodiments shown in FIG. 8A and FIG. 8B, the linear electrode portions 22a of the common electrode 22 each are provided between the adjacent linear electrode portions 31a of the pixel electrode 31 as viewed in plan from the direction indicated by the arrow A. Particularly, in FIG. 8A, each of the linear electrode portions 31a and a corresponding one of the opposite linear electrode portions 22a are spaced apart at an electrode interval $D_0$, whereas, in FIG. 8B, the electrode interval $D_0$ between each of the linear electrode portions 31a and a corresponding one of the opposite linear electrode portions 22a is set to $D_0=0$ (zero). In the case of the embodiment shown in FIG. 6, each of the common electrodes 22 is a planar electrode that overlaps a corresponding one of the pixel electrodes 31 in plan view and, as a result, the electrode interval $D_0$ is 0 (zero).

An IPS mode and an FFS mode are known as a lateral electric field driving mode; however, in the aspects of the invention, in order to make it possible to form lateral oblique electric field (that is, parabolic electric field) for implementing an FFS mode, the electrode interval $D_0$ shown in FIG. 8A is set so that the electrode interval $D_0$ is smaller than the liquid crystal layer thickness $D_1$ of the liquid crystal layer 14, that is, $D_1 > D_0$. Particularly, in the embodiment, as shown in FIG. 6, the common electrode 22 is provided in a planar manner (so-called solid) in each region of the sub-pixels P (display pixels Pa) on the first transparent substrate 15 and, as a result, $D_0$ is equal to 0 (zero). Note that, in FIG. 8A, when the electrode interval $D_0$ is made larger than the liquid crystal layer thickness $D_1$, that is, set so that $D_1 < D_0$, an IPS mode may be realized instead of an FFS mode.

Next, in FIG. 7, the configuration of the pixel electrode formed of the gaps 35 and the linear electrode portions 31a is not limited to the configuration shown in the drawing; however, for example, it is possible to place the inclined directions of the gaps 35 symmetrically relative to the center of the short side direction (that is, row direction X) of the sub-pixel P in the row direction X. That is, the upper ends of the gaps 35 in the left half of the sub-pixel P may be inclined to the right side, and the upper ends of the gaps 35 in the right half of the sub-pixel P may be inclined to the left side.

Configuration Formed on Color Filter Substrate 9 within Display Pixel Pa

Next, with reference to FIG. 3, FIG. 4, and FIG. 6, the film components formed on the second transparent substrate 17 within the display pixel Pa in regard to the color filter substrate 9 will be described. As shown in FIG. 6, pigmented films 36 that constitute color filters are formed on the inner surface (that is, the surface adjacent to the liquid crystal) of the second transparent substrate 17, and a light shielding film 37 is formed around the pigmented films 36. Each of the pigmented films 36, as shown in FIG. 3 as viewed from the direction indicated by the arrow A, is formed into a rectangular or quadratic dot-like (that is, island-like) shape corresponding to the display pixel Pa (sub-pixel P). In addition, the plurality of pigmented films 36 are arranged in a matrix in the row direction X and in the column direction Y. The light shielding film 37 is formed in a grid so as to surround those pigmented films 36.

Each of the pigmented films 36 is set to an optical characteristic that allows any one of R (red color), G (green color), B (blue color) to pass through, and the pigmented films 36 of those R, G, B are arranged in a stripe. In the specification, the reference signs of (R), (G), (B) suffixed to the reference numeral 36 respectively indicate that the colors of the pigmented films are red color, green color, and blue color. The stripe arrangement is such an arrangement that the same colors of R, G, and B are arranged in the column direction Y and the colors of R, G, and B are alternately arranged in the row direction X. Instead of the stripe arrangement, the pigmented films 36 of respective colors may be arranged in another manner, such as, for example, mosaic arrangement or delta arrangement. Note that the optical characteristics of the pigmented films 36 are not limited to three colors of R, G, and B, but they may be three colors of C (cyan), M (magenta), and Y (yellow) or may be four colors or more. The light shielding film 37 is formed as a resin film such that two or three colors of the pigmented films 36 having different colors are laminated. However, the light shielding film 37 may be formed of metal film, such as Cr.

In FIG. 4 and FIG. 6, an overcoat layer 38 is formed on the pigmented films 36 and the light shielding film 37, and an alignment layer 39 is formed on the overcoat layer 38. The overcoat layer 38 is provided in a planar manner (solid) so as to cover the pigmented films 36 and the light shielding film 37. Each of the pigmented films 36 is, for example, formed by mixing pigment or dye with photosensitive resin material. The overcoat layer 38 is, for example, formed of acrylic resin. The alignment layer 39 is formed of polyimide. The overcoat layer 38 functions as a protection film that prevents materials of color filters from being mixed with the liquid crystal and also functions as a planarizing film that planarizes the surfaces of the color filters.

As shown in FIG. 6, a rubbing direction treated on the alignment layer 39 that is formed on the side of the color filter substrate 9 and a rubbing direction treated on the alignment layer 32 that is formed on the side of the element substrate 8 are placed in antiparallel directions, both of which are parallel to the column direction Y. In addition, a polarization axis of the first polarizer 16 formed on the element substrate 8 (on the rear side relative to viewing side) and a polarization axis of the second polarizer 18 formed on the color filter substrate 9 (on the viewing side) are perpendicular to each other, and the polarization axis of the second polarizer 18 placed on the viewing side is parallel to the rubbing directions of the alignment layers 39, 32, and the polarization axis of the first polarizer 16 placed on the rear side relative to the viewing side is perpendicular to the rubbing directions.

Operation of Display Pixel Pa

The configuration within the display pixel Pa is as described above, so that, when planar light is supplied from the lighting device 3 to the liquid crystal panel 2 as shown in FIG. 1, light is supplied from the rear side of the sheet of FIG. 2 to the display pixel Pa. When an off voltage is applied in the display pixels Pa between the common electrodes 22 and the pixel electrodes 31, polarized light transmitted through the liquid crystal layer 14 is absorbed by the second polarizer 18 placed on the viewing side and blocked from exiting outside, thus performing black display. When an on voltage is applied between the common electrodes 22 and the pixel electrodes 31, polarized light transmitted through the liquid crystal layer 14 passes through the second polarizer 18 placed on the viewing side and exits outside, thus performing white display.

An image is displayed in the display area V by controlling the above described black display and white display in each of the plurality of sub-pixels P (particularly, display pixel Pa) within the display area V shown in FIG. 1. At this time, by appropriately controlling the intensity of R, G, and B transmission light within each of the pixel sets, it is possible to display a desired full-color image. In the present embodiment, because alignment of the liquid crystal molecules 14a is controlled in the horizontal plane between the substrates on the basis of lateral electric field when black display control or white display control are performed, in comparison with the case of a vertical electric field driving mode, typically, a TN (Twisted Nematic) mode, in which alignment of the liquid crystal molecules is controlled in the vertical plane of the substrates, it is possible to realize a wide viewing angle characteristic. That is, an image may be normally recognized not only in the case where the image is viewed from the front side (that is, the polar angle=0° or approximately 0°) of the display area V shown in FIG. 1 but also in the case where the image is viewed obliquely from a lateral direction that is largely inclined from the front side (the direction in which the polar angle is large).

Configuration Formed on Element Substrate 8 within Viewing Angle Control Pixel Pb Next, with reference to FIG. 2, FIG. 5, and FIG. 6, the film components formed on the first transparent substrate 15 within the viewing angle control pixel Pb in regard to the element substrate 8 will be described. As shown in FIG. 5, the gate line 20, the common line 21 and a common electrode 42, which serves as a second electrode, are formed on the first transparent substrate 15 of the element substrate 8 within the viewing angle control pixel Pb. The gate insulating film 23 is formed on the gate line 20, the common line 21 and the common electrode 42. The components of the TFT element 26, other than the gate electrode 20a, and the source line 24 are formed on the gate insulating film 23. The passivation film 30 is formed on the components of the TFT element 26, other than the gate electrode 20a, and the source line 24. A pixel electrode 51, which serves as a first electrode, is formed on the passivation film 30. The alignment layer 32 is formed on the pixel electrode 51.

The gate line 20, the common line 21, the gate insulating film 23, the TFT element 26, the source line 24, the passivation film 30 and the alignment layer 32 are the same components as those denoted by the same reference numerals within the display pixel Pa shown in FIG. 4, and those components are formed of the same materials in the same processes. In addition, the common electrode 42 is also formed of the same material in the same process as those of the common electrode 22 within the display pixel Pa. Note that the common electrode 22 within the display pixel Pa and the common electrode 42 within the viewing angle control pixel Pb may be formed into rectangular shapes having different sizes (that is, areas) where necessary.

The pixel electrode 31, which is formed within the display pixel Pa shown in FIG. 4, is formed of the strip-shaped gaps 35, extending in the column direction Y, and the linear electrode portions 31a, provided alternately with the gaps 35, as shown in FIG. 7. In contrast, the pixel electrode 51 of the present embodiment is formed of strip-shaped gaps 45, extending in the row direction X, and linear electrode portions 51a, provided alternately with those gaps 45, as shown in FIG. 2. The pixel electrode 51 is formed of the same material in the same process as those of the pixel electrode 31 within the display pixel Pa. However, the gaps 45 and the linear electrode portions 51a, which constitute the pixel electrode 51, are different from the gaps 35 and the linear electrode portions 31a, which constitute the pixel electrode 31 of the display pixel Pa, and are arranged substantially perpendicularly to the alignment direction of the liquid crystal molecules 14a that are aligned in the column direction Y. That is, an initial alignment direction of the liquid crystal molecules 14a is placed along a direction of electric field that is generated within the viewing angle control pixel Pb between the pixel electrode 51 and the common electrode 42 and that is parallel to the surface of the first transparent substrate. Here, the phrase "located along" includes variation in angle of about ±5° because of variation in manufacturing accuracy of electrode, variation in direction of electric field and other manufacturing variation. When the initial alignment direction of the liquid crystal molecules 14a is placed along the direction of electric field that is generated within the viewing angle control pixel Pb between the pixel electrode 51 and the common electrode 42 and that is parallel to the surface of the first transparent substrate, the obtained angle is able to effectively control a viewing angle. As the angle deviates from the above angle, controllability of viewing angle decreases. When the angle deviates more than ±15°, controllability of viewing angle sharply decreases.

Configuration Formed on Color Filter Substrate 9 within Viewing Angle Control Pixel Pb Next, with reference to FIG. 3, FIG. 5, and FIG. 6, the film components formed on the second transparent substrate 17 within the viewing angle control pixel Pb in regard to the color filter substrate 9 will be described. As described above, in regard to the display pixels Pa, the pigmented films 36 are formed on the second transparent substrate 17, and the overcoat layer 38 and the alignment layer 39 are formed on the pigmented films 36. In contrast, in regard to the viewing angle control pixels Pb, as shown in FIG. 5 and FIG. 6, without forming the pigmented films 36, the overcoat layer 38 is directly formed on the second transparent substrate 17.

Operation of Viewing Angle Control Pixel Pb

As described above, because, in each of the viewing angle control pixels Pb, the common electrode 42, which serves as the second electrode, and the pixel electrode 51, which serves as the first electrode, are provided on the one element substrate 8, when an on voltage is applied between the above electrodes, lateral electric field, which is electric field parallel to the substrates, is generated within the viewing angle control pixel Pb as in the case of the display pixel Pa. However, the linear electrode portions 51a of the pixel electrode 51 provided in each of the viewing angle control pixels Pb are formed so as to intersect with the initial alignment direction of the liquid crystal molecules 14a, which is different from the linear electrode portions 31a provided in each of the display pixels Pa. In other words, the initial alignment direction of the liquid crystal molecules 14a is placed along the direction of electric field that is generated within the viewing angle control pixel Pb between the pixel electrode 51 and the common electrode 42 and that is parallel to the surface of the element substrate 8. Thus, as an on voltage is applied within the viewing angle control pixel Pb between the common electrode 42 and the linear electrode portions 51a, alignment of the liquid crystal molecules 14a is changed from the direction parallel to the substrates into the direction perpendicular to the substrates.

As a predetermined off voltage is applied to the liquid crystal layer 14 within the viewing angle control pixel Pb, the liquid crystal molecules maintain a state of lateral arrangement, which is an initial state. Then, the viewing angle control pixel Pb appears black display when viewed from the front side (polar angle=0° or approximately 0°) or when viewed from the inclined direction (the direction of which the polar angle is large). In this state, when an image display is performed on the basis of lateral electric field control within the display pixel Pa, it is possible to view the image display both from the front side and from the inclined direction (that is, wide-angle region). In this manner, it is possible to perform wide viewing angle display.

On the other hand, when a predetermined on voltage is applied to the liquid crystal layer 14 within the viewing angle control pixel Pb, alignment of the liquid crystal molecules is changed to a vertical arrangement direction, which is perpendicular to the substrates, on the basis of electric field generated between the common electrode 42 and the linear electrode portions 51a. Then, the viewing angle control pixel Pb still appears black display as viewed from the front side; however, as viewed from a direction inclined to the side, it is possible to recognize bright transmission light that has passed through the viewing angle control pixel Pb. In this state, when an image display is performed in the display pixel Pa on the basis of lateral electric field control, it is possible to view the display from the front side. On the other hand, when viewed from the direction inclined to the side, light emitted from the display pixel Pa itself remains unchanged, but light emitted from the viewing angle control pixel Pb increases its intensity. As a result, the contrast of light emitted from the display pixel Pa decreases and, hence, light emitted from the display pixel Pa (that is, image display) cannot be recognized. In this manner, narrow viewing angle display is realized.

In an existing art, it has been known that viewing angle control is performed using a viewing angle compensation panel in addition to an image display panel. However, in this existing liquid crystal device, there is a problem in that the overall thickness of the liquid crystal device increases or component costs and/or manufacturing costs increase. In contrast, according to the liquid crystal device 1 of the present embodiment, because viewing angle control may be performed only by controlling a voltage applied to the viewing angle control pixels Pb in one liquid crystal panel 2, it is possible to reduce the overall thickness of the liquid crystal device 1 and also it is possible to suppress component costs and/or manufacturing costs to a smaller amount. Particularly, in recent years, it is strongly needed to reduce the thickness of an electronic apparatus, typically, such as a cellular phone. Because viewing angle control may be performed with a single liquid crystal panel, the above configuration largely contributes to such a need for reducing the thickness.

In addition, according to the present embodiment, because the viewing angle control pixel Pb, as well as the display pixel Pa, has a lateral electric field type electrode structure, that is, a structure in which a pair of electrodes are provided on one substrate and does not have a structure in which an electrode is provided on both the pair of substrates, it is possible to simplify an electrode structure and a wiring structure between the pair of substrates and also to increase an allowable error in assembly deviation between the pair of substrates. Thus, it is possible to greatly reduce the number of defective liquid crystal devices being manufactured.

Figure 10:
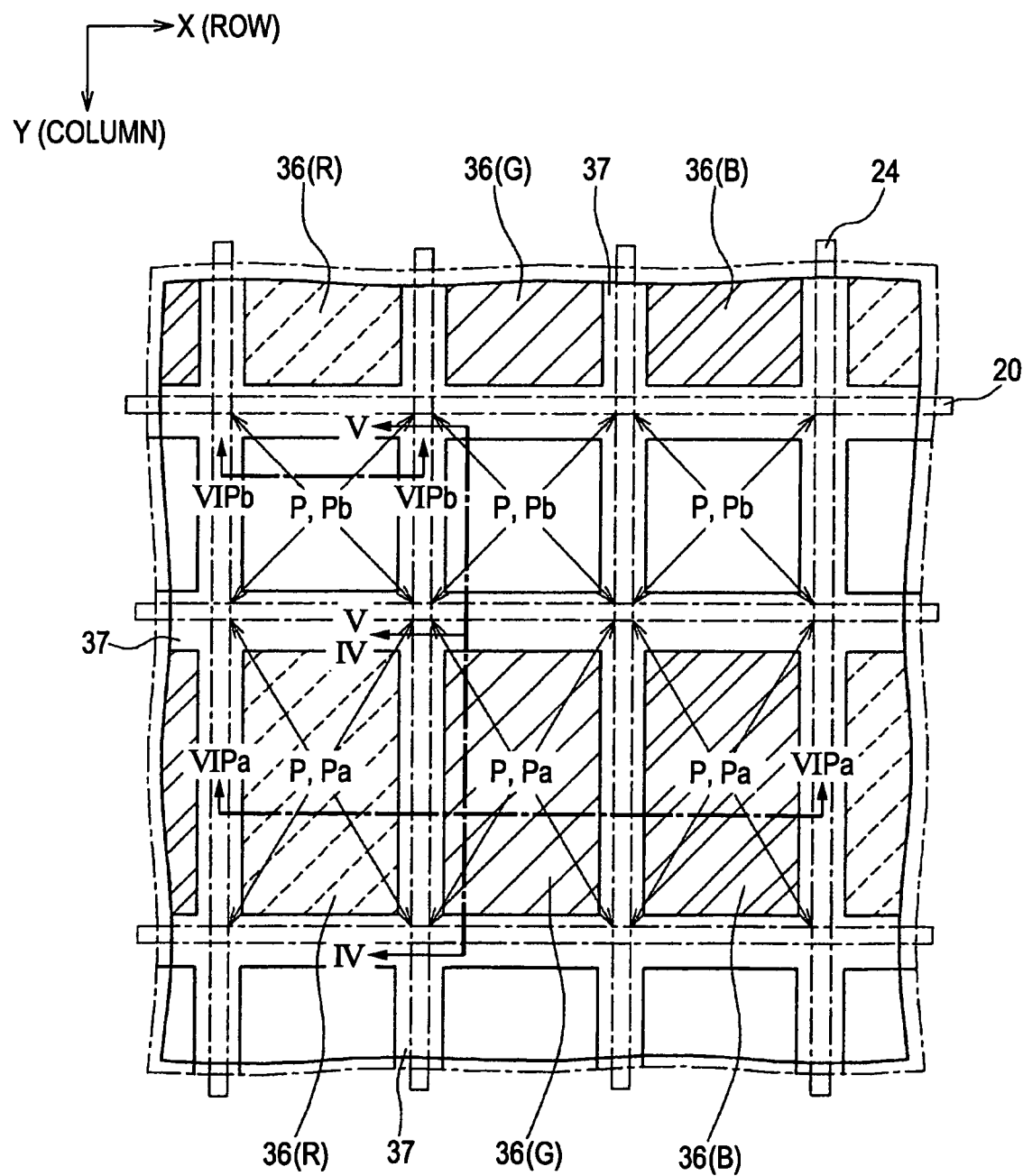
FIG. 10 is a plan view that shows a substrate that is opposed to the substrate shown in FIG. 9.
Figure 11:
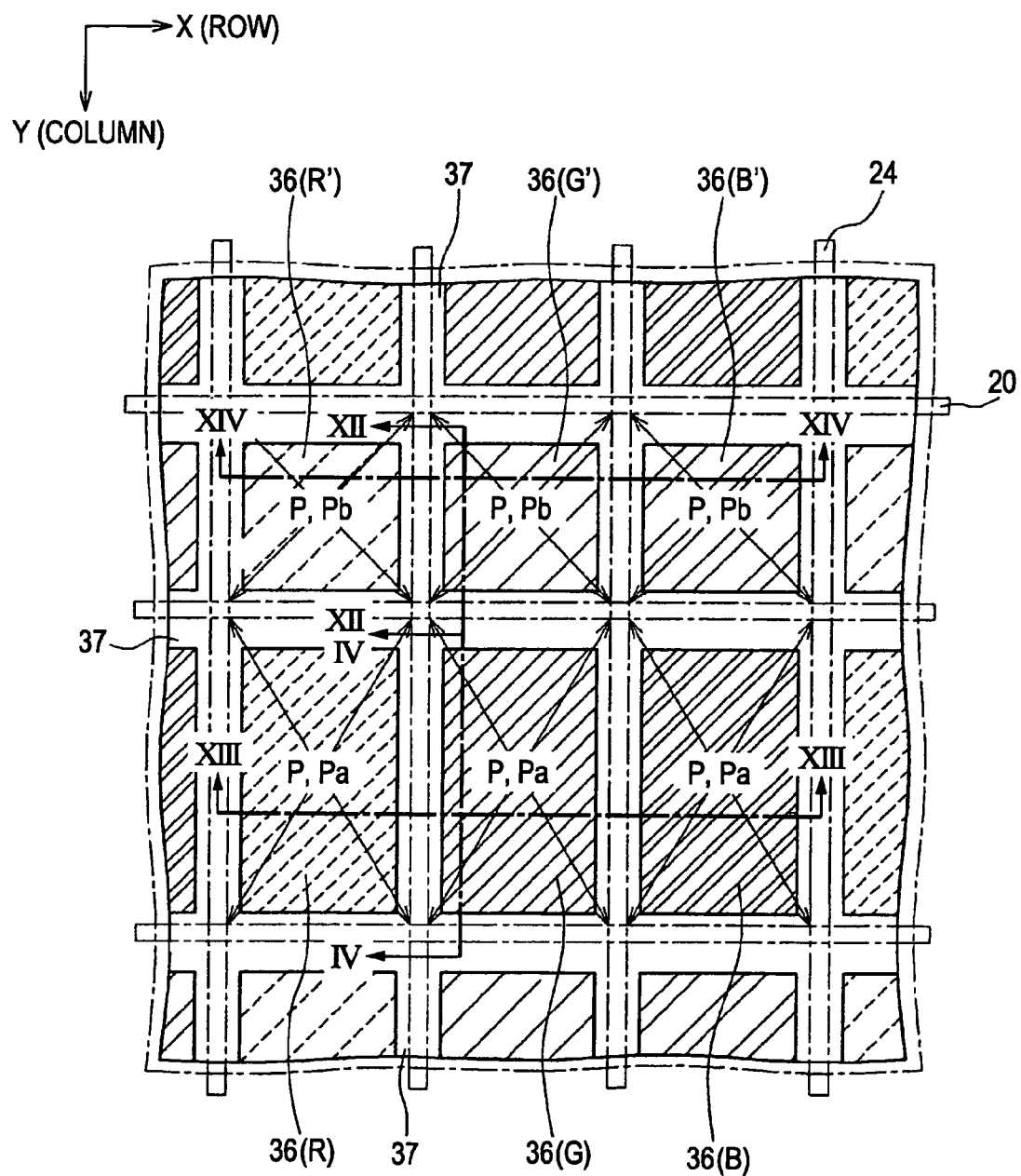
FIG. 11 is a plan view that shows a relevant portion of a liquid crystal device according to yet another embodiment of the invention, specifically showing a pixel set and its neighborhood on one substrate.

The present embodiment is a technology for making it difficult to view an image display from an oblique direction by eliminating or reducing the contrast of the image display, among technologies for making it difficult to view a display when viewed from an oblique direction in comparison with when viewed from the front side. In the present embodiment, as shown in FIG. 2 and FIG. 3, one viewing angle control pixel Pb is provided in correspondence with three R, G, B display pixels Pa. In comparison with the structure in which, as shown in FIG. 10 and FIG. 11, which will be described later, the viewing angle control pixel Pb is provided in correspondence with each of the display pixels Pa, it is conceivable that the performance decreases in terms of eliminating the contrast. However, according to the present embodiment, in comparison with the structure in which the viewing angle control pixel Pb is provided in correspondence with each of the display pixels Pa, it is advantageous in that a wiring is simple and a high aperture ratio may be maintained.

Alternative Embodiment

In the above described embodiment, as shown in FIG. 6, the pigmented film 36 is provided in each of the display pixels Pa, and no film component is provided in the same layer as the pigmented film 36 within the viewing angle control pixel Pb Instead of this configuration, film components that transmit light of all wavelengths, a so-called perfect transmission film, may be provided in the viewing angle control pixel Pb with the same thickness as that of the pigmented film 36.

In addition, in the above described embodiment, as shown in FIG. 2 and FIG. 3, one viewing angle control pixel Pb is provided in correspondence with three R, G, B display pixels Pa (that is, one pixel set). However, when the brightness of each display pixel Pa decreases because of an increase in NTSC rate or an increase in definition of resolution, the total area of the viewing angle control pixels Pb may be reduced. When this is the case, not by providing one viewing angle control pixel Pb for every single R, G, B pixel set but by only providing one viewing angle control pixel Pb for every two R, G, B pixel sets or for every two or more pixel sets, it is possible to sufficiently obtain viewing angle controllability. In this case, it is possible to increase the aperture ratio by an amount an area of the viewing angle control pixel Pb is reduced, and it is possible to achieve bright display in a wide angle display mode.

Second Embodiment of Liquid Crystal Device

Figure 9:
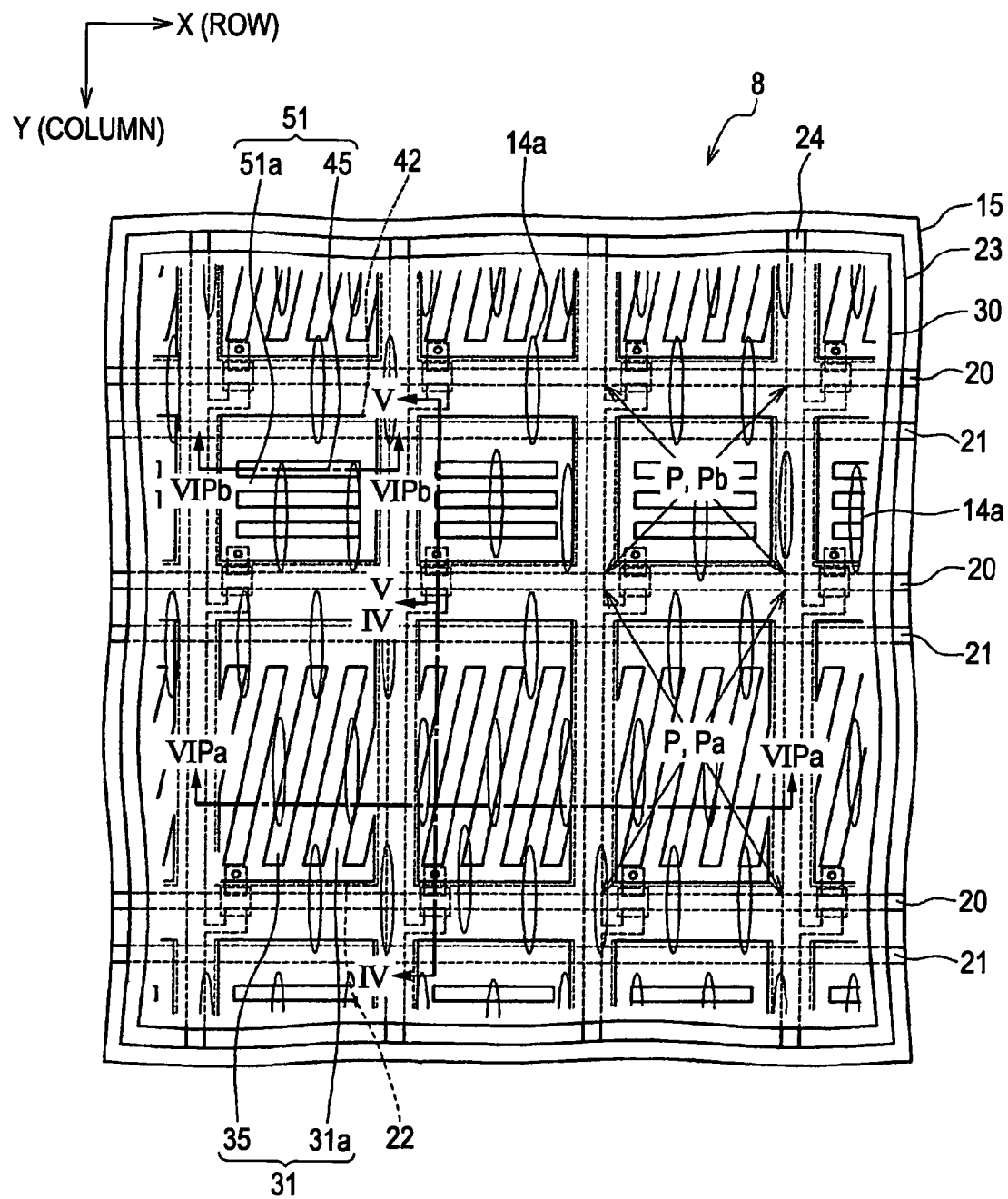
FIG. 9 is a plan view that shows a relevant portion of a liquid crystal device according to another embodiment of the invention, specifically showing a pixel set and its neighborhood on one substrate.

FIG. 9 and FIG. 10 are views that show a second embodiment of the liquid crystal device according to the invention. FIG. 9 is a plan view of an element substrate corresponding to FIG. 2 of the first embodiment that is described with reference to FIG. 2 to FIG. 6. FIG. 10 is a plan view of a color filter substrate corresponding to FIG. 3 of the first embodiment. The general configuration of the liquid crystal device according to the second embodiment is the same as that of the first embodiment shown in FIG. 1.

The cross-sectional structure along the column direction Y of one sub-pixel P (particularly, display pixel Pa), taken along the line IV-IV in FIG. 9, is the same as the cross-sectional structure shown in FIG. 4 in the first embodiment. The cross-sectional structure along the column direction Y of one sub-pixel (particularly, viewing angle control pixel Pb), taken along the line V-V in FIG. 9, is the same as the cross-sectional structure shown in FIG. 5 in the first embodiment. However, the lengths of the display pixel Pa in the row direction X and in the column direction Y and the lengths of the viewing angle control pixel Pb in the row direction X and in the column direction Y shown in FIG. 9 are varied, where appropriate, in comparison with the lengths of the display pixel Pa in the row direction X and in the column direction Y and the lengths of the viewing angle control pixel Pb in the row direction X and in the column direction Y shown in FIG. 2.

The cross-sectional structure along the row direction X of three R, G, B display pixels Pa (that is, one pixel set), taken along the line VIPa-VIPa in FIG. 9, is the same as the cross-sectional structure of three R, G, B display pixels Pa in the cross-sectional structure shown in FIG. 6 in the first embodiment. The cross-sectional structure along the row direction X of the viewing angle control pixel Pb, taken along the line VIPb-VIPb in FIG. 9, is the same as the cross-sectional structure of the viewing angle control pixel Pb in the cross-sectional structure shown in FIG. 6 in the first embodiment.

In the first embodiment shown in FIG. 2 to FIG. 6, as shown in FIG. 3, the viewing angle control pixel Pb is provided adjacent to the display pixel Pa in the row direction X (that is, in the horizontal direction). In addition, the viewing angle control pixel Pb is provided in correspondence with every three R, G, B display pixels Pa (that is, one pixel set). In contrast, in the present embodiment, as shown in FIG. 10, each of the viewing angle control pixels Pb is provided adjacent to the display pixel Pa in the column direction Y (that is, in the longitudinal direction of the pixel or in the vertical direction). Moreover, each of the viewing angle control pixels Pb is provided in correspondence with each of the display pixels Pa.

Operation of Display Pixel Pa

In the present embodiment as well, when planar light is supplied from the lighting device 3 to the liquid crystal panel 2 as shown in FIG. 1, light is supplied from the rear side of the sheet of FIG. 9 to the display pixel Pa. When an off voltage is applied in the display pixel Pa between the common electrode 22 and the pixel electrode 31, polarized light transmitted through the liquid crystal layer 14 is absorbed by the second polarizer 18 on the viewing side and blocked from exiting outside, thus performing black display. When an on voltage is applied between the common electrode 22 and the pixel electrode 31, polarized light transmitted through the liquid crystal layer 14 passes through the second polarizer 18 on the viewing side and exits outside, thus performing white display.

An image is displayed in the display area V by controlling the above described black display or white display in each of the plurality of sub-pixels P (particularly, display pixels Pa) within the display area V shown in FIG. 1. At this time, by appropriately controlling the intensity of R, G, B transmission light within each of the pixel sets, it is possible to display a desired full-color image. In the present embodiment, because alignment of the liquid crystal molecules 14a is controlled in the horizontal plane between the substrates on the basis of lateral electric field when black display control or white display control is performed, in comparison with the case of a vertical electric field driving mode, typically, a TN mode, in which alignment of the liquid crystal molecules is controlled in the vertical plane between the substrates, it is possible to realize a wide viewing angle characteristic. That is, an image may be normally recognized not only in the case where the image is viewed from the front side of the display area V shown in FIG. 1 but also in the case where the image is viewed from an obliquely lateral direction that is largely inclined from the front side. In this manner, it is possible to perform wide viewing angle control.

Operation of Viewing Angle Control Pixel Pb

In the present embodiment as well, as shown in FIG. 6, in each of the viewing angle control pixels Pb, the common electrode 42, which serves as the second electrode, and the pixel electrode 51, which serves as the first electrode, are provided on the element substrate 8, and the pixel electrode 51, as shown in FIG. 9, has the gaps 45 and the linear electrode portions 51a, both of which extend in a direction perpendicular to the initial alignment direction of the liquid crystal molecules 14a. As a predetermined off voltage is applied between the common electrode 42 and the pixel electrode 51 within the viewing angle control pixel Pb, the liquid crystal molecules maintain a state of lateral arrangement, which is an initial state. Then, the viewing angle control pixel Pb appears black display when viewed from the front side or when viewed from the inclined direction. In this state, when a display is performed on the basis of lateral electric field control within the display pixel Pa, it is possible to view the display both from the front side and from the inclined direction (that is, wide-angle region). In this manner, it is possible to perform wide viewing angle display.

On the other hand, when a predetermined on voltage is applied between the common electrode 42 and the pixel electrode 51 within the viewing angle control pixel Pb, alignment of the liquid crystal molecules is changed into a vertical arrangement direction, which is perpendicular to the substrates. The viewing angle control pixel Pb still appears black display as viewed from the front side; however, as viewed from a direction inclined to the side, it is possible to recognize bright transmission light that has passed through the viewing angle control pixel Pb. In this state, when an image display is performed in the display pixel Pa on the basis of lateral electric field control, it is possible to view the display from the front side as well. On the other hand, when viewed from the direction inclined to the side, light emitted from the display pixel Pa itself remains unchanged, but light emitted from the viewing angle control pixel Pb increases its intensity. As a result, the contrast of light emitted from the display pixel Pa decreases and, hence, light emitted from the display pixel Pa (that is, image display) cannot be recognized. In this manner, narrow viewing angle display is realized.

In an existing art, it has been known that viewing angle control is performed using a viewing angle compensation panel in addition to an image display panel. However, in this existing liquid crystal device, there is a problem that the overall thickness of the liquid crystal device increases or component costs and/or manufacturing costs increase. In contrast, according to the liquid crystal device 1 of the present embodiment, because viewing angle control may be performed only by controlling a voltage applied to the viewing angle control pixels Pb in one liquid crystal panel 2, it is possible to reduce the overall thickness of the liquid crystal device 1 and also it is possible to suppress component costs and/or manufacturing costs to a smaller amount. Particularly, in recent years, it is strongly needed to reduce the thickness of an electronic apparatus, typically, such as a cellular phone. Because the viewing angle control may be performed with a single liquid crystal panel, the above configuration largely contributes to such a need for reducing the thickness.

In addition, according to the present embodiment, because the viewing angle control pixel Pb, as well as the display pixel Pa, has a lateral electric field type electrode structures that is, a structure in which a pair of electrodes are provided on one substrate and does not have a structure in which an electrode is provided on both the pair of substrates, it is possible to simplify an electrode structure and a wiring structure between the pair of substrates and also to increase an allowable error in assembly deviation between the pair of substrates. Thus, it is possible to largely reduce the number of defective liquid crystal devices being manufactured.

The present embodiment is a technology for making it difficult to view an image display from an oblique direction by eliminating or reducing the contrast of the image display, among technologies for making it difficult to view a display when viewed from an oblique direction in comparison with when viewed from the front side. In the present embodiment, as shown in FIG. 9 and FIG. 10, because the viewing angle control pixel Pb is provided in correspondence with each of the display pixels Pa, it has a high ability in terms of eliminating the contrast.

Third Embodiment of Liquid Crystal Device

FIG. 11 is a view that shows a color filter substrate, which is a relevant portion of a third embodiment of the liquid crystal device according to the invention. The third embodiment shown herein is a modified embodiment that is obtained by modifying the second embodiment shown in FIG. 9 and FIG. 10. FIG. 11 is a plan view corresponding to FIG. 10 in the second embodiment and, therefore, is a plan view of the color filter substrate 9 corresponding to FIG. 3 in the first embodiment that is described with reference to FIG. 2 to FIG. 6. The element substrate used in the present embodiment is the same as the element substrate 8 shown in FIG. 9 used in the second embodiment.

Figure 12:
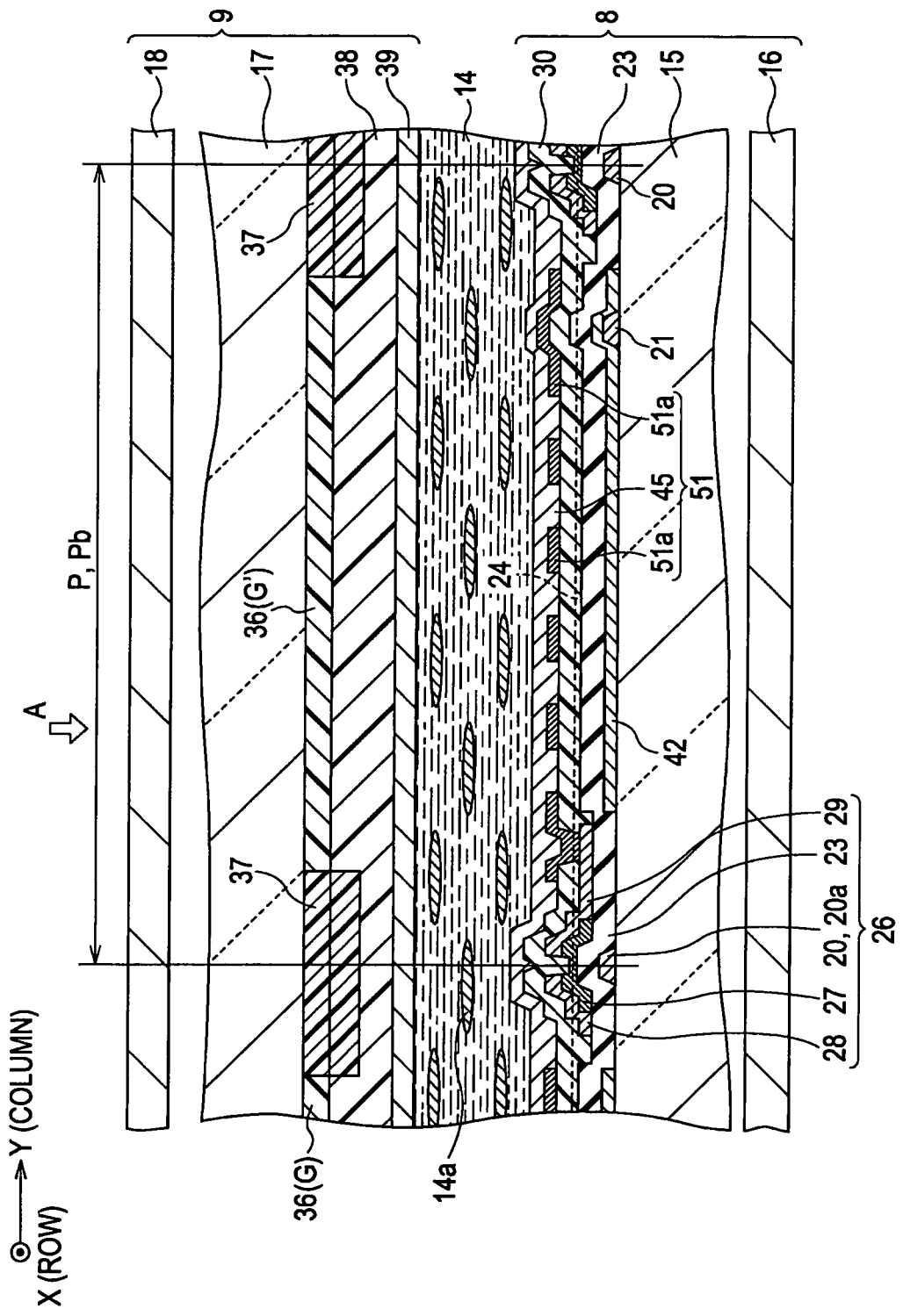
FIG. 12 is a cross-sectional view of a viewing angle control pixel along a column direction, taken along the line XII-XII in FIG. 11.
Figure 13:
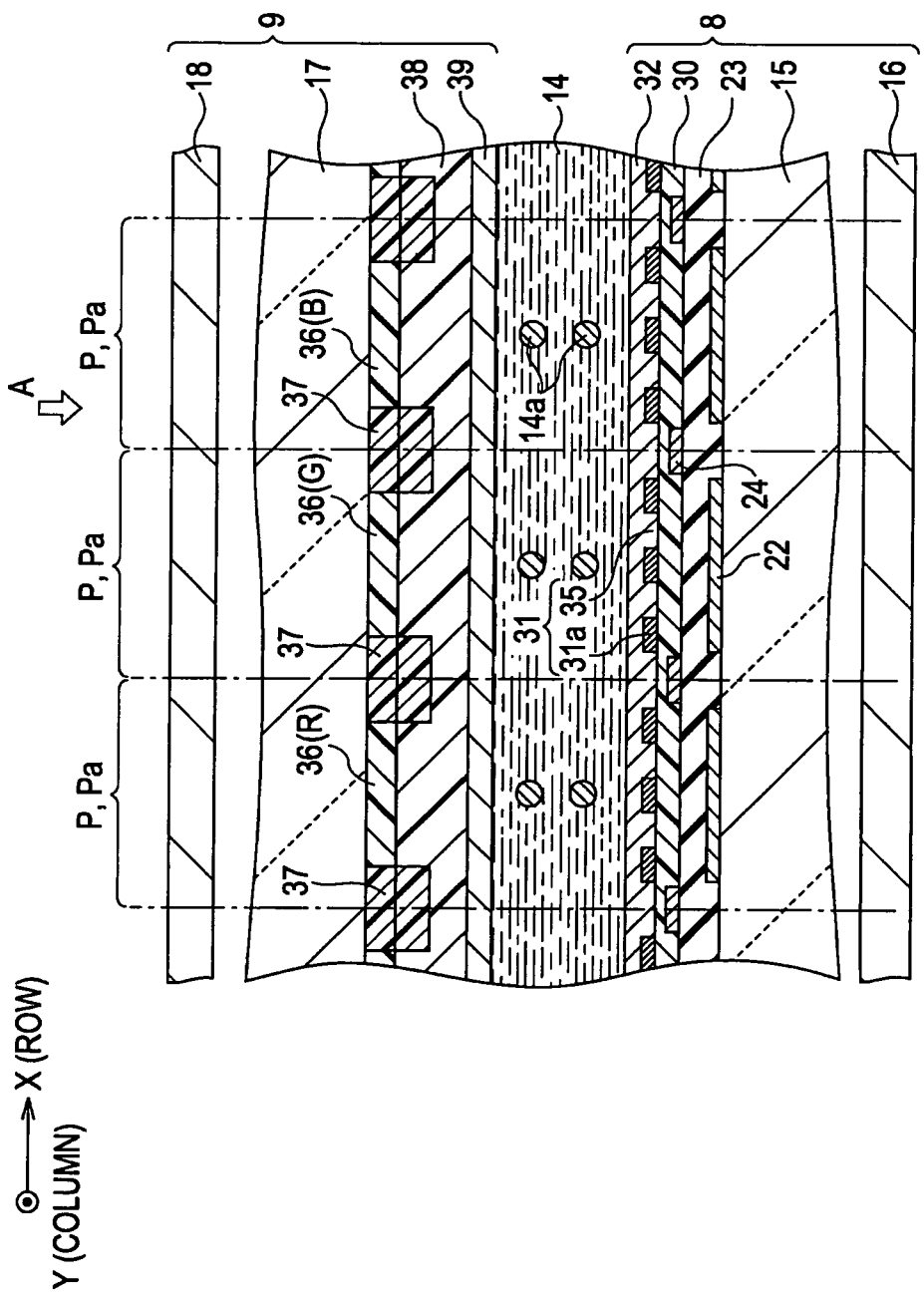
FIG. 13 is a cross-sectional view of display pixels along a row direction, taken along the line XIII-XIII in FIG. 11.
Figure 14:
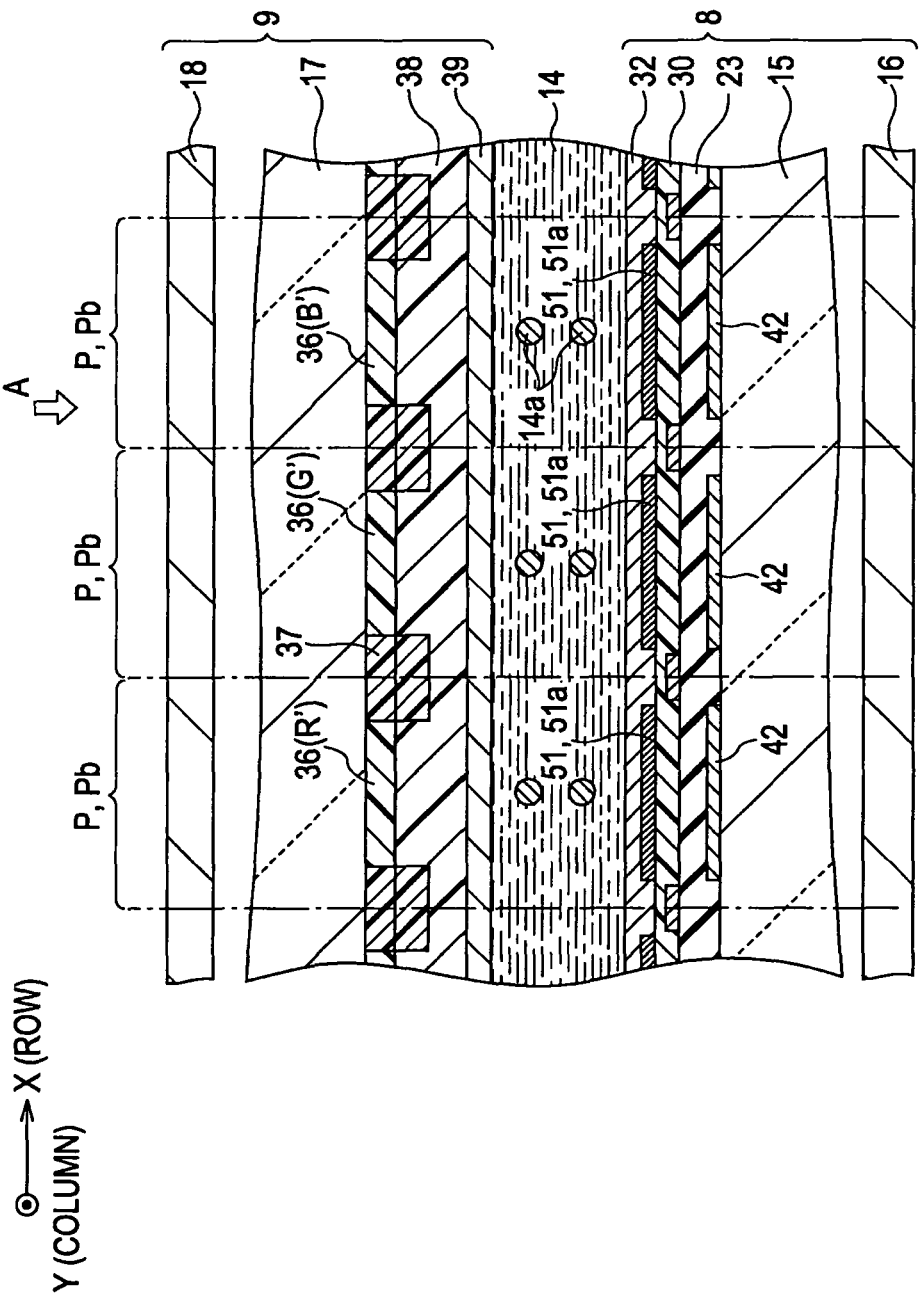
FIG. 14 is a cross-sectional view of viewing angle control pixels along a row direction, taken along the line XIV-XIV in FIG. 11.

FIG. 12 is a view that shows a cross-sectional structure of the viewing angle control pixel Pb along the column direction Y, taken along the line XII-XII in FIG. 11. FIG. 13 is a view that shows a cross-sectional structure of the three display pixels Pa (that is, one pixel set) along the row direction X, taken along the line XIII-XIII in FIG. 11. FIG. 14 is a view that shows a cross-sectional structure of the three viewing angle control pixels Pb along the row direction X, taken along the line XIV-XIV in FIG. 11. Note that the general configuration of the liquid crystal device according to the third embodiment is the same as that of the first embodiment shown in FIG. 1.

In the second embodiment shown in FIG. 10, as shown in FIG. 5 and FIG. 6, no pigmented film 36 is provided on the color filter substrate 9 in regard to the viewing angle control pixel Pb adjacent to each of the display pixels Pa in the column direction Y. In contrast, in the third embodiment, as shown in FIG. 13, the pigmented films 36(R), 36(G), 36(B) corresponding to R, G, B colors are provided in the display pixels Pa, and, in addition, as shown in FIG. 12 and FIG. 14, pigmented films 36(R'), 36(G'), 36(B') are also provided in the viewing angle control pixels Pb on the color filter substrate 9.

The pigmented film 36(R') is an R (red color) pigmented film as in the case of the pigmented film 36(R) in the display pixel Pa, and is a pigmented film having a color lighter than that of the pigmented film 36(R) (thus, more intensive light is transmitted). The pigmented film 36(G') is a G (green color) pigmented film as in the case of the pigmented film 36(G) in the display pixel Pa, and is a pigmented film having a color lighter than that of the pigmented film 36(G) (thus, more intensive light is transmitted). Furthermore, the pigmented film 36(B') is a B (blue color) pigmented film as in the case of the pigmented film 36(B) in the display pixel Pa, and is a pigmented film having a color lighter than that of the pigmented film 36(B) (thus, more intensive light is transmitted). The depth of color of the pigmented film may be adjusted by appropriately selecting a color material that forms the pigmented film.

Operation of Display Pixel Pa

In the present embodiment as well, when planar light is supplied from the lighting device 3 to the liquid crystal panel 2 as shown in FIG. 1, light is supplied from the rear side of the sheet of FIG. 11 to the display pixel Pa. Referring to FIG. 9, when an off voltage is applied in the display pixel Pa between the common electrode 22 and the pixel electrode 31, polarized light transmitted through the liquid crystal layer 14 is absorbed by the second polarizer 18 placed on the viewing side and blocked from exiting outside, thus performing black display. When an on voltage is applied between the common electrode 22 and the pixel electrode 31, polarized light transmitted through the liquid crystal layer 14 passes through the second polarizer 18 placed on the viewing side and exits outside, thus performing white display.

An image is displayed in the display area V by controlling the above described black display or white display in each of the plurality of sub-pixels P (particularly, display pixel Pa) within the display area V shown in FIG. 1. At this time, by appropriately controlling the intensity of R, G, B transmission light within each of the pixel sets, it is possible to display a desired full-color image. In the present embodiment, because alignment of the liquid crystal molecules 14a is controlled in the horizontal plane between the substrates on the basis of lateral electric field when black display control or white display control is performed, in comparison with the case of a vertical electric field driving mode, typically, a TN mode, in which alignment of the liquid crystal molecules is controlled in the vertical plane between the substrates, it is possible to realize a wide viewing angle characteristic. That is, an image may be normally recognized not only in the case where the image is viewed from the front side of the display area V shown in FIG. 1 but also in the case where the image is viewed from an obliquely lateral direction that is largely inclined from the front side. In this manner, it is possible to perform wide viewing angle control.

Operation of Viewing Angle Control Pixel Pb

In the present embodiment as well, as shown in FIG. 12 and FIG. 14, in each of the viewing angle control pixels Pb, the common electrode 42, which serves as the second electrode, and the pixel electrode 51, which serves as the first electrode, are provided on the element substrate 8, and the pixel electrode 51, as shown in FIG. 9, has the gaps 45 and the linear electrode portions 51a, both of which extend in a direction perpendicular to the initial alignment direction of the liquid crystal molecules 14a. As a predetermined off voltage is applied between the common electrode 42 and the pixel electrode 51 within the viewing angle control pixel Pb, the liquid crystal molecules maintain a state of lateral arrangement, which is an initial state. Then, the viewing angle control pixel Pb appears black display when viewed from the front side or when viewed from the inclined direction. In this state, when a display is performed on the basis of lateral electric field control within the display pixel Pa, it is possible to view the display both from the front side and from the inclined direction (that is, wide-angle region). In this manner, it is possible to perform wide viewing angle display.

On the other hand, when a predetermined on voltage is applied between the common electrode 42 and the pixel electrode 51 within the viewing angle control pixel Pb, alignment of the liquid crystal molecules is changed into a vertical arrangement direction, which is perpendicular to the substrates. The viewing angle control pixel Pb still appears black display as viewed from the front side; however, as viewed from a direction inclined to the side, it is possible to recognize bright transmission light that has passed through the viewing angle control pixel Pb. In this state, when an image display is performed in the display pixel Pa on the basis of lateral electric field control, it is possible to view the display from the front side. On the other hand, when viewed from the direction inclined to the side, light emitted from the display pixel Pa itself remains unchanged, but light emitted from the viewing angle control pixel Pb increases its intensity. As a result, the contrast of light emitted from the display pixel Pa decreases and, hence, light emitted from the display pixel Pa (that is, image display) cannot be recognized. In this manner, narrow viewing angle display is realized.

In an existing art, it has been known that viewing angle control is performed using a viewing angle compensation panel in addition to an image display panel. However, in this existing liquid crystal device, there is a problem that the overall thickness of the liquid crystal device increases or component costs and/or manufacturing costs increase. In contrast, according to the liquid crystal device 1 of the present embodiment, because viewing angle control may be performed only by controlling a voltage applied to the viewing angle control pixels Pb in one liquid crystal panel 2, it is possible to reduce the overall thickness of the liquid crystal device 1 and also it is possible to suppress component costs and/or manufacturing costs to a smaller amount. Particularly, in recent years, it is strongly needed to reduce the thickness of an electronic apparatus, typically, such as a cellular phone. Because the viewing angle control may be performed with a single liquid crystal panel, the above configuration largely contributes to such a need for reducing the thickness.

In addition, according to the present embodiment, because the viewing angle control pixel Pb, as well as the display pixel Pa, has a lateral electric field type electrode structure, that is, a structure in which a pair of electrodes are provided on one substrate and does not have a structure in which an electrode is provided on both the pair of substrates, it is possible to simplify an electrode structure and a wiring structure between the pair of substrates and also to increase an allowable error in assembly deviation between the pair of substrates. Thus, it is possible to largely reduce the number of defective liquid crystal devices being manufactured.

Alternative Embodiment

In the above described embodiment, as shown in FIG. 11, the pigmented film having a low color depth is provided in the viewing angle control pixel Pb. Instead of providing the pigmented film having a low color depth in the viewing angle control pixel Pb as described above, a pigmented film may be provided so that the pigmented film has the same color depth as that of the pigmented film in the display pixel Pa but it partly has a non-pigmented region and thereby to be able to reduce the color depth of transmission light. The non-pigmented region may be implemented by forming a non-pigmented film region within the pigmented film. The planar shape of the non-pigmented film region may be a circular shape, a quadratic shape, a rectangular shape or any selected shape having a size that fits in the viewing angle control pixel Pb. The above non-pigmented film region may be formed by means of photolithography process.

Fourth Embodiment of Liquid Crystal Device

Figure 15:
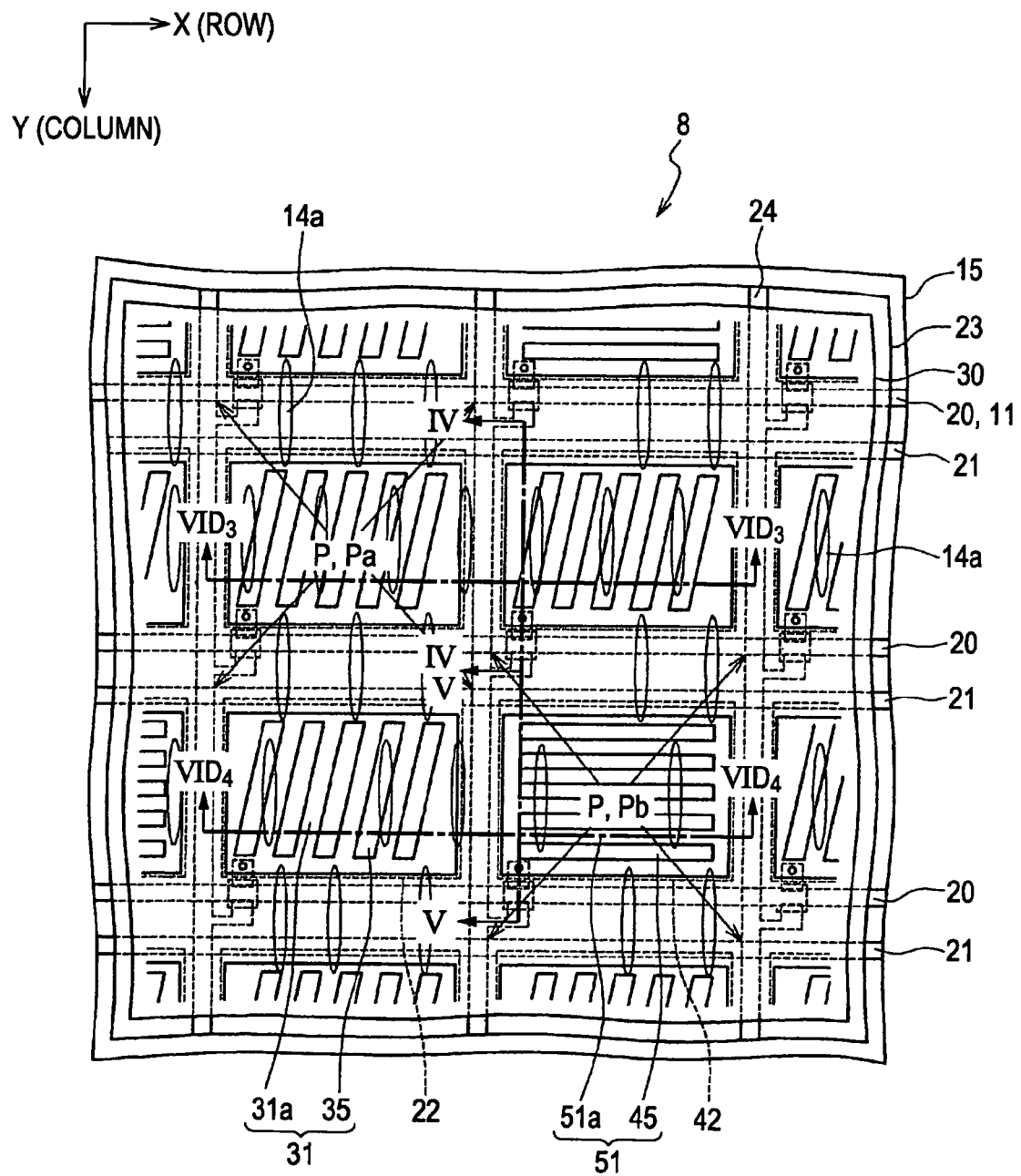
FIG. 15 is a plan view that shows a relevant portion of a liquid crystal device according to further yet another embodiment of the invention, specifically showing a pixel set and its neighborhood on one substrate.
Figure 16:
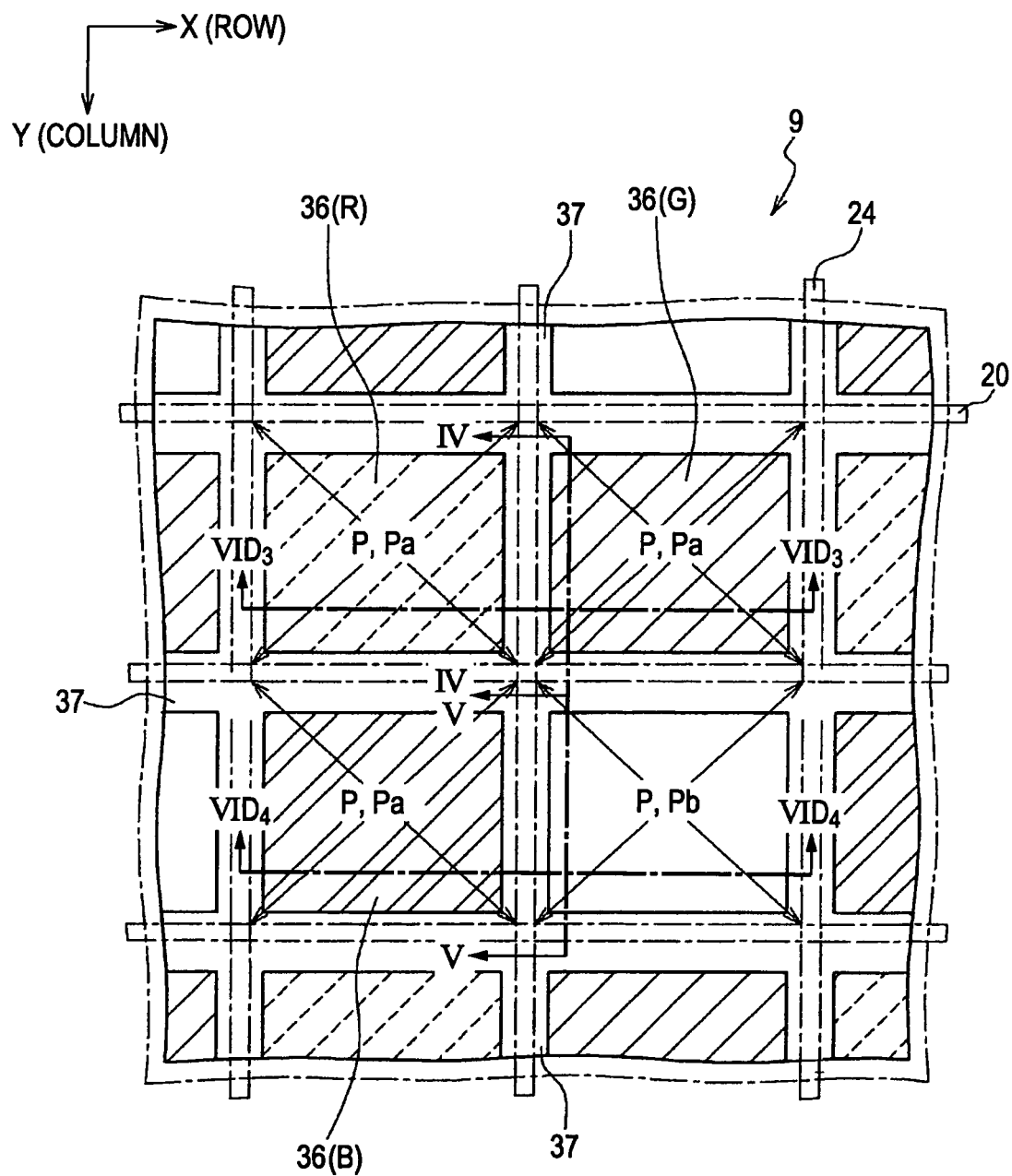
FIG. 16 is a plan view that shows a substrate that is opposed to the substrate shown in FIG. 15.

FIG. 15 and FIG. 16 are views that show a fourth embodiment of the liquid crystal device according to the invention. The present embodiment is a modified embodiment that is obtained by adding modification to the first embodiment that is described with reference to FIG. 2 to FIG. 6. FIG. 15 is a plan view of an element substrate corresponding to FIG. 2 of the first embodiment. FIG. 16 is a plan view of a color filter substrate corresponding to FIG. 3 of the first embodiment. The general configuration of the liquid crystal device according to the fourth embodiment is the same as that of the first embodiment shown in FIG. 1.

The cross-sectional structure along the column direction Y of one sub-pixel P (particularly, display pixel Pa), taken along the line IV-IV in FIG. 15, is the same as the cross-sectional structure shown in FIG. 4 in the first embodiment. The cross-sectional structure along the column direction Y of one sub-pixel (particularly, viewing angle control pixel Pb), taken along the line V-V in FIG. 15, is the same as the cross-sectional structure shown in FIG. 5 in the first embodiment. However, the lengths of the display pixel Pa in the row direction X and in the column direction Y and the lengths of the viewing angle control pixel Pb in the row direction X and in the column direction Y shown in FIG. 15 are varied, where appropriate, in comparison with the lengths of the display pixel Pa in the row direction X and in the column direction Y and the lengths of the viewing angle control pixel Pb in the row direction X and in the column direction Y shown in FIG. 2.

The cross-sectional structure along the row direction X of two display pixels Pa, taken along the line VID$_3$-VID$_3$ in FIG. 15, is a cross-sectional structure such that the cross-sectional structure of two R, G display pixels Pa in a range indicated by the reference sign D3 in the cross-sectional structure shown in FIG. 6 in the first embodiment continues. The cross-sectional structure along the row direction X of two sub-pixels P, taken along the line VID$_4$-VID$_4$ in FIG. 15, is a cross-sectional structure such that the cross-sectional structure of two sub-pixels P, that is, the display pixel Pa and the viewing angle control pixel Pb, in a range indicated by the reference sign D4 in the cross-sectional structure shown in FIG. 6 in the first embodiment continues.

In the first embodiment shown in FIG. 2 to FIG. 6, as shown in FIG. 3, the viewing angle control pixel Pb is provided adjacent to the display pixel Pa in the row direction X (that is, in the horizontal direction). In addition, the viewing angle control pixel Pb is provided in correspondence with every three R, G, B display pixels Pa (that is, one pixel set). In contrast, in the present embodiment, as shown in FIG. 16, two color "R", "GV" pigmented films 36(R), 36(G) among three colors R, G, B are arranged adjacent to each other in the longitudinal direction (row direction X) of the pigmented films 36, and the remaining one color "B" pigmented film 36(B) is arranged adjacent to the "R" pigmented film 36(R) in a direction perpendicular to the longitudinal direction (column direction Y). Furthermore, the viewing angle control pixel Pb is arranged adjacent to the "B" pigmented film 36(B) in the longitudinal direction (row direction X). Then, a group of the thus arranged one pixel set and viewing angle control pixel Pb that is associated with the one pixel set is arranged in a matrix in the row direction X and in the column direction Y, so that the display area V shown in FIG. 1 is formed. Note that R, G, B may be interchanged appropriately in a state of arrangement shown in FIG. 16.

In the present embodiment as well, as shown in FIG. 4, the common electrode 22, which serves as the second electrode, and the pixel electrode 31, which serves as the first electrode, are provided on the element substrate 8 within each of the display pixels Pa, and the pigmented films 36 that constitute color filters are provided on the color filter substrate 9. On the other hand, as shown in FIG. 5, the common electrode 42, which serves as the second electrode, and the pixel electrode 51, which serves as the first electrode, are provided on the element substrate 8 within each of the viewing angle control pixels Pb, and no pigmented film is provided on the color filter substrate 9.

Operation of Display Pixel Pa

In the present embodiment as well, when planar light is supplied from the lighting device 3 to the liquid crystal panel 2 as shown in FIG. 1, light is supplied from the rear side of the sheet of FIG. 15 to the display pixel Pa. When an off voltage is applied in the display pixel Pa between the common electrode 22 and the pixel electrode 31, polarized light transmitted through the liquid crystal layer 14 (see FIG. 4) is absorbed by the second polarizer 18 placed on the viewing side and blocked from exiting outside, thus performing black display. When an on voltage is applied between the common electrode 22 and the pixel electrode 31, polarized light transmitted through the liquid crystal layer 14 passes through the second polarizer 18 placed on the viewing side and exits outside, thus performing white display.

An image is displayed in the display area V by controlling the above described black display or white display in each of the plurality of sub-pixels P (particularly, display pixel Pa) within the display area V shown in FIG. 1. At this time, by appropriately controlling the intensity of R, G, B transmission light within each of the pixel sets, it is possible to display a desired full-color image. In the present embodiment, because alignment of the liquid crystal molecules 14a is controlled in the horizontal plane between the substrates on the basis of lateral electric field when black display control or white display control is performed, in comparison with the case of a vertical electric field driving mode, typically, a TN mode, in which alignment of the liquid crystal molecules is controlled in the vertical plane between the substrates, it is possible to realize a wide viewing angle characteristic. That is, an image may be normally recognized not only in the case where the image is viewed from the front side of the display area V shown in FIG. 1 but also in the case where the image is viewed from an obliquely lateral direction that is largely inclined from the front side. In this manner, it is possible to perform wide viewing angle control.

Operation of Viewing Angle Control Pixel Pb

In the present embodiment as well, as shown in FIG. 5, in each of the viewing angle control pixels Pb, the common electrode 42, which serves as the second electrode, and the pixel electrode 51, which serves as the first electrode, are provided on the element substrate 8, and the pixel electrode 51, as shown in FIG. 15, has the gaps 45 and the linear electrode portions 51a, both of which extend in a direction perpendicular to the initial alignment direction of the liquid crystal molecules 14a. As a predetermined off voltage is applied between the common electrode 42 and the pixel electrode 51 within the viewing angle control pixel Pb, the liquid crystal molecules maintain a state of lateral arrangement, which is an initial state. Then, the viewing angle control pixel Pb appears black display when viewed from the front side or when viewed from the inclined direction. In this state, when a display is performed on the basis of lateral electric field control within the display pixel Pa, it is possible to view the display both from the front side and from the inclined direction (that is, wide-angle region). In this manner, it is possible to perform wide viewing angle display.

On the other hand, when a predetermined on voltage is applied between the common electrode 42 and the pixel electrode 51 within the viewing angle control pixel Pb, alignment of the liquid crystal molecules is changed into a vertical arrangement direction, which is perpendicular to the substrate. The viewing angle control pixel Pb still appears black display as viewed from the front side; however, as viewed from a direction inclined to the side, it is possible to recognize bright transmission light that has passed through the viewing angle control pixel Pb. In this state, when an image display is performed in the display pixel Pa on the basis of lateral electric field control, it is possible to view the display from the front side. On the other hand, when viewed from the direction inclined to the side, light emitted from the display pixel Pa itself remains unchanged, but light emitted from the viewing angle control pixel Pb increases its intensity. As a result, the contrast of light emitted from the display pixel Pa decreases and, hence, light emitted from the display pixel Pa (that is, image display) cannot be recognized. In this manner, narrow viewing angle display is realized.

In an existing art, it has been known that viewing angle control is performed using a viewing angle compensation panel in addition to an image display panel. However, in this existing liquid crystal device, there is a problem that the overall thickness of the liquid crystal device increases or component costs and/or manufacturing costs increase. In contrast, according to the liquid crystal device 1 of the present embodiment, because viewing angle control may be performed only by controlling a voltage applied to the viewing angle control pixels Pb in one liquid crystal panel 2, it is possible to reduce the overall thickness of the liquid crystal device 1 and also it is possible to suppress component costs and/or manufacturing costs to a smaller amount. Particularly, in recent years, it is strongly needed to reduce the thickness of an electronic apparatus, typically, such as a cellular phone. Because the viewing angle control may be performed with a single liquid crystal panel, the above configuration largely contributes to such a need for reducing the thickness.

In addition, according to the present embodiment, because the viewing angle control pixel Pb, as well as the display pixel Pa, has a lateral electric field type electrode structure, that is, a structure in which a pair of electrodes are provided on one substrate and does not have a structure in which an electrode is provided on both the pair of substrates, it is possible to simplify an electrode structure and a wiring structure between the pair of substrates and also to increase an allowable error in assembly deviation between the pair of substrates. Thus, it is possible to largely reduce the number of defective liquid crystal devices being manufactured.

Another Embodiment

The aspects of the invention are described by taking the embodiments for example; however, the aspects of the invention are not limited to the above described embodiments, but they may be modified into various forms within the scope of the invention as set forth in the appended claims.

For example, in the above described embodiments, an FFS mode is exemplified as an operation mode of the liquid crystal panel; however, an IPS mode may also be used as an operation mode. In the IPS mode, the linear electrode portions of the common electrode and the linear electrode portions of the pixel electrode are provided along the respective surfaces of the substrates at relatively wide intervals (for example, intervals wider than the thickness of the liquid crystal layer), and the IPS mode has an electrode structure such that it is difficult to form electric field in a region immediately above the linear electrode portions of each pixel electrode. In contrast, in the FFS mode, the linear electrode portions of the common electrode and the linear electrode portions of the pixel electrode are provided along the respective surfaces of the substrates at relatively narrow intervals (for example, intervals narrower than the thickness of the liquid crystal layer), and the FFS mode has an electrode structure such that it is also possible to form electric field in a region immediately above the linear electrode portions of each pixel electrode.

Next, the general structure of the liquid crystal device 1 shown in FIG. 1 is merely an example of the liquid crystal device. In FIG. 1, a so-called a COG (Chip On Glass) method mounting structure in which one side extends from the element substrate 8 relative to the color filter substrate 9 and a driving IC 44 is directly mounted on the extended one side is exemplified. However, the liquid crystal device may be configured so that a plurality of extended sides are provided and a driving IC is mounted on each of the extended sides. In addition, instead of the COG method, it may be configured so that a driving IC is connected to the liquid crystal panel using an FPC (Flexible Printed Circuit) substrate.

Embodiments of Electronic Apparatus

Figure 17:
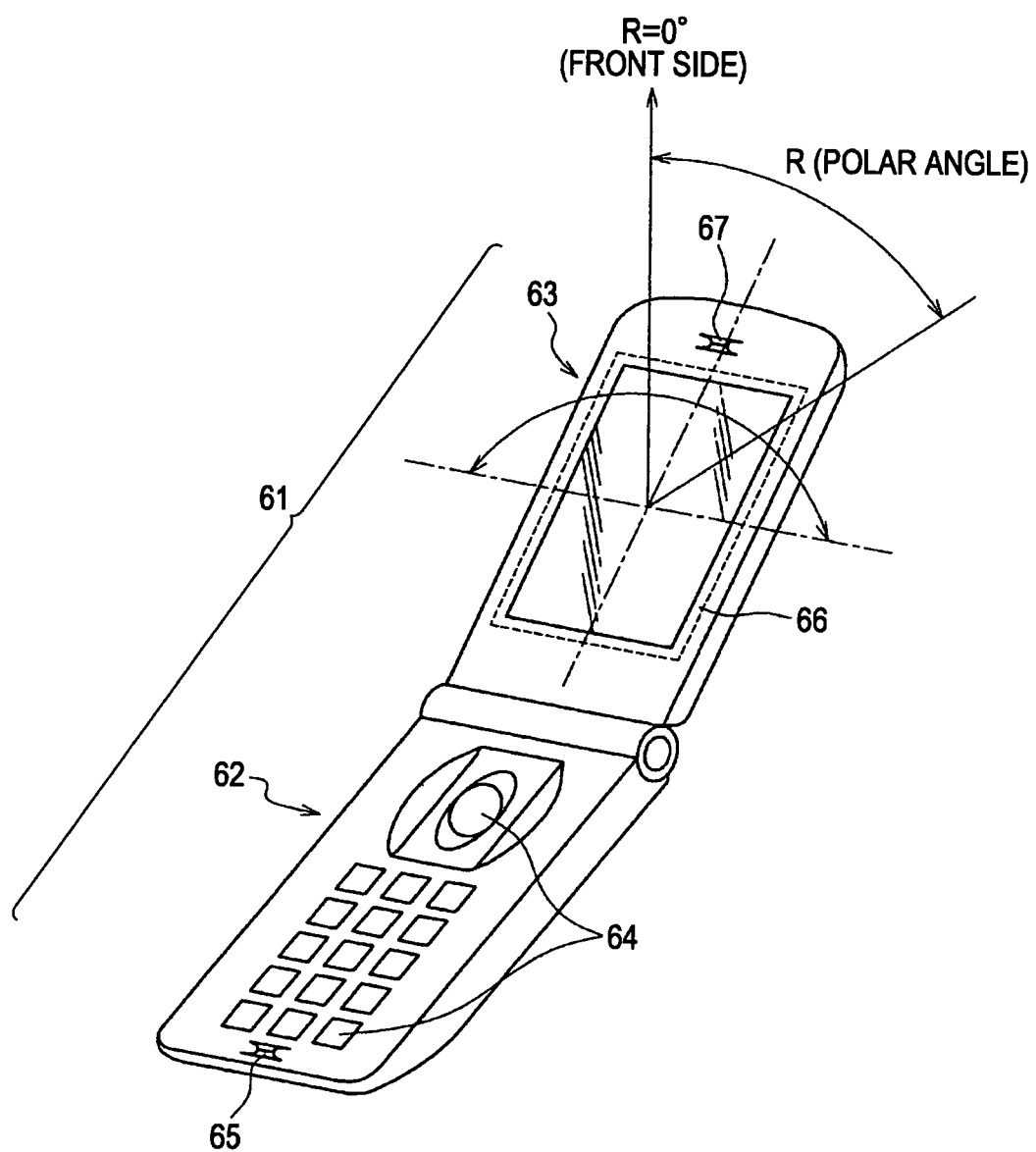
FIG. 17 is a perspective view of a cellular phone, which is one embodiment of an electronic apparatus according to the invention.

FIG. 17 is a view of a cellular phone, which is one embodiment of an electronic apparatus according to the invention. The cellular phone 61 includes an operating unit 62 and a display unit 63 that is provided for the operating unit 62 so as to be openable and closeable. The operating unit 62 is provided with a plurality of operation buttons 64 and a microphone portion 65. The display unit 63 is provided with a display device 66 and an earphone 67.

The display device 66 is, for example, configured using the liquid crystal device 1 shown in FIG. 1. The display device 66, when an off voltage is applied to the viewing angle control pixel to perform black display, is able to perform display within a wide range of polar angle R with respect to the front side (R=0 degree) as the center (so-called wide viewing angle display) by controlling the display of the display pixels in the FFS mode. On the other hand, when an on voltage is applied to the viewing angle control pixel to perform white display, an image display as viewed from the front side remains unchanged; however, the contrast of an image display as viewed from a wide viewing angle region of which the polar angle R is large is reduced or eliminated by light emitted from the viewing angle control pixel, so that the image display cannot be recognized. In this manner, narrow viewing angle display is realized.

The liquid crystal device of the present embodiment does not use two or more liquid crystal panels to perform viewing angle control but uses a single liquid crystal panel to perform viewing angle control, so that it is possible to maintain the small overall thickness of the liquid crystal device. Thus, the thickness of the cellular phone 61 never becomes thick.

Other Embodiments

The electronic apparatus according to the aspects of the invention is described by taking the embodiments for example; however, the aspects of the invention are not limited to the above described embodiments, but they may be modified into various forms within the scope of the invention as set forth in the appended claims. For example, the aspects of the invention may include not only the cellular phone but also various electronic apparatuses, such as a personal computer, a liquid crystal display television, a viewfinder type or a direct view type video tape recorder, a car navigation system, a pager, a personal organizer, an electronic calculator, a word processor, a workstation, a video telephone, a point-of-sales terminal, a digital still camera, or an electronic book. In any one of the electronic apparatuses, it is possible to perform viewing angle display control between wide viewing angle display and narrow viewing angle display using an extremely thin display device.

First Example

Figure 18:
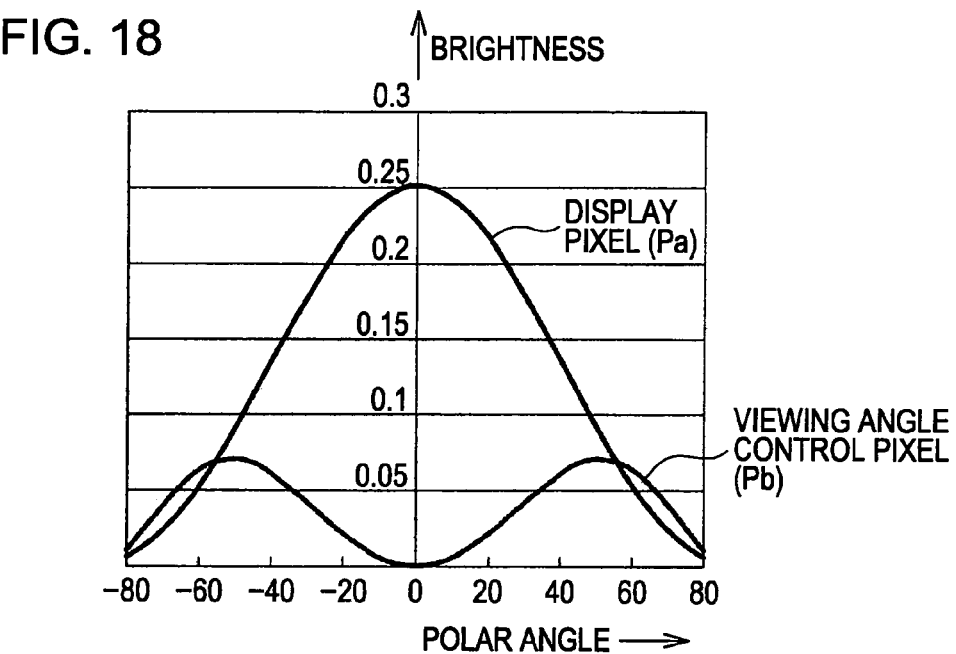
FIG. 18 is a chart that shows characteristics of brightness distribution in display of the liquid crystal device according to the invention.

FIG. 18 is a brightness distribution chart of the results of simulation by calculating variation in brightness of light transmitted to a viewing angle direction (polar angle) when a liquid crystal layer, in which liquid crystal molecules are arranged in a lateral direction (horizontal direction to the substrate) in an initial state, is interposed between substrates of lateral electric field structure, and an on voltage is applied to both the display pixels Pa and the viewing angle control pixels Pb. The abscissa axis of this distribution chart represents a polar angle of a viewing direction, and the ordinate axis represents brightness of transmission light.

Both the display pixels Pa and the viewing angle control pixels Pb, when an off voltage is applied, appear black display when viewed from the front side and when viewed from a left or right oblique direction; however, when an on voltage is applied to them, brightness appears differently as shown in FIG. 18. As is shown in the distribution chart, when the liquid crystal panel is viewed from the front side while an on voltage is being applied, the display pixels Pa become bright and the viewing angle control pixels Pb remain dark. On the other hand, when viewed obliquely (that is, when the polar angle is large, that is, the absolute value of the abscissa axis in the distribution chart is large), the display pixels Pa gradually become dark, whereas the viewing angle control pixels Pb once become bright and thereafter become dark. This may be understood that, by switching an on voltage and an off voltage being applied to the viewing angle control pixels Pb, it is possible to switch the viewing angle characteristic of the liquid crystal panel between wide viewing angle display and narrow viewing angle display.

Figure 19:
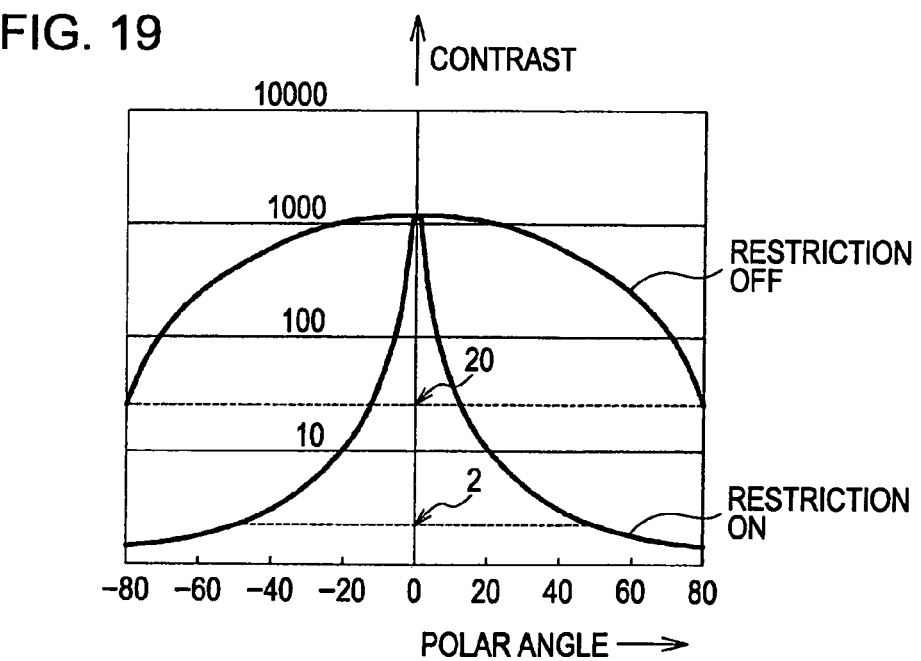
FIG. 19 is a graph that shows a difference in contrast that is achieved by both display pixels and viewing angle control pixels in the liquid crystal device according to the invention when viewing angle control is performed and when no viewing angle control is performed.

FIG. 19 is a graph that shows the results of simulation by calculating variation in viewing angle characteristic between the time when viewing angle control is performed (when an on voltage is applied to the viewing angle control pixels Pb) and the time when no viewing angle control is performed (when an off voltage is applied to the viewing angle control pixels Pb) in the liquid crystal device according to the first embodiment shown in FIG. 2 to FIG. 6. In FIG. 19, the abscissa axis represents a polar angle, and the ordinate axis represents a contrast (contrast between the display pixels and the viewing angle control pixels). When no viewing angle control is performed, that is, when an off voltage is applied to the viewing angle control pixels Pb, the contrast is maintained at 20 or above within a range of ±80 degrees of the polar angle. This proves that the wide viewing angle display is performed. On the other hand, when viewing angle control is performed, that is, an on voltage is applied to the viewing angle control pixels Pb, the contrast is 2 or below within a range of ±50 degrees of the polar angle. This may be understood that the narrow viewing angle display, in which it is extremely difficult to view an image, is realized.

The narrow viewing angle display state shown in FIG. 18 and FIG. 19 depends on a tilt state of the liquid crystal or a distribution state of a tilt of the liquid crystal within pixels. Therefore, it is possible to obtain a desired viewing angle control state on the basis of voltage applied to pixels, electrode width, electrode interval, or the like.

What is claimed is:

1. A liquid crystal device comprising:
a first substrate;
a second substrate that is opposed to the first substrate;
a liquid crystal layer that is provided between the first substrate and the second substrate;
a plurality of display pixels; and
a plurality of viewing angle control pixels,
wherein the plurality of display pixels and the plurality of viewing angle control pixels are arranged in a planar region of the first substrate and second substrate to form a display area,
wherein each of the display pixels and each of the viewing angle control pixels each drive the liquid crystal layer by an electric field generated between a first electrode and a second electrode, both of which are provided on the first substrate,
wherein in each of the viewing angle control pixels, a direction of a plane along which the electric field is generated between the first electrode and the second electrode is substantially parallel to an initial alignment direction of liquid crystal molecules of the liquid crystal layer,
wherein in each of the viewing angle control pixels, when an on voltage is applied between the first electrode and the second electrode, the liquid crystal molecules are arranged perpendicular to the first substrate and the second substrate, and when an off voltage is applied between the first electrode and the second electrode, the liquid crystal molecules are arranged parallel to the first substrate and the second substrate, and
wherein a first light transmissive pigmented film of a first predetermined color other than white is provided in at least a first portion of the plurality of display pixels and at least a portion of the plurality of viewing angle control pixels, which are formed adjacent to the first portion of the plurality of display pixels.

2. The liquid crystal device according to claim 1, wherein a holding capacitance of each of the display pixels is equal to a holding capacitance of each of the viewing angle control pixels.

3. The liquid crystal device according to claim 1, wherein liquid crystal that constitutes the liquid crystal layer has a positive anisotropy of dielectric constant, wherein any one of the first electrode and the second electrode of each of the display pixels has a plurality of linear electrode portions that are arranged parallel to one another with gaps formed between the adjacent linear electrode portions, and wherein a direction in which the linear electrode portions extend falls within an inclination angle range of 0° to ±45° relative to a longitudinal direction of the display pixels.

4. The liquid crystal device according to claim 3, wherein the initial alignment direction of the liquid crystal molecules is 0° to 15° relative to the direction in which the linear electrode portions extend within each of the display pixels.

5. The liquid crystal device according to claim 1, wherein the plurality of display pixels are formed so that sub-pixels of multiple colors are grouped to form a unit pixel, wherein a plurality of the unit pixels are arranged to form the display area, and wherein each of the viewing angle control pixels is provided for each of the unit pixels formed of the display pixels.

6. The liquid crystal device according to claim 5, wherein the unit pixel formed of the display pixels is formed of sub-pixels that respectively have pigmented films of multiple colors, wherein the sub-pixels are arranged in a stripe such that the same colors are arranged in a first direction, which is a longitudinal direction of the display pixels, and different colors are arranged in a second direction perpendicular to the first direction, and wherein each of the viewing angle control pixels is provided between one unit pixel formed of the display pixels and another unit pixel adjacent to the one unit pixel in the second direction.

7. The liquid crystal device according to claim 5, wherein the unit pixel formed of the display pixels is formed of sub-pixels that respectively have pigmented films of three colors of R (red color), G (green color), B (blue color), wherein the sub-pixels of two colors among the three colors are arranged adjacent to each other in a longitudinal direction of the display pixels, wherein the sub-pixel of the remaining one color among the three colors is arranged adjacent to any one of the sub-pixels of the two colors in a direction perpendicular to the longitudinal direction, and wherein each of the viewing angle control pixels is arranged adjacent to the sub-pixel of the remaining one pixel in the longitudinal direction.

8. The liquid crystal device according to claim 1, wherein an area of the unit pixel formed of the display pixels is larger than an area of each of the viewing angle control pixels.

9. The liquid crystal device according to claim 1, wherein the first electrode and the second electrode, formed within each of the display pixels, each have a plurality of linear electrode portions that are arranged parallel to one another with gaps formed between the adjacent linear electrode portions, and wherein, where an interval between each of the linear electrode portions of the first electrode and a corresponding one of the linear electrode portions of the second electrode is $D_0$ and a thickness of the liquid crystal layer is $D_1$, $D_1$ is larger than $D_0$.

10. The liquid crystal device according to claim 1, wherein the first electrode, formed within each of the display pixels, has a plurality of linear electrode portions that are arranged parallel to one another with gaps formed between the adjacent linear electrode portions, and wherein the second electrode formed within each of the display pixels is a planar electrode that does not have a gap.

11. The liquid crystal device according to claim 1, wherein the first substrate has a first polarizer, and the second substrate has a second polarizer, wherein liquid crystal alignment direction of the first substrate and liquid crystal alignment direction of the second substrate are antiparallel to each other, wherein a polarization axis of the first polarizer and a polarization axis of the second polarizer are perpendicular to each other, and wherein one of the polarization axis of the first polarizer and the polarization axis of the second polarizer is parallel to the liquid crystal alignment directions.

12. The liquid crystal device according to claim 1, wherein a pigmented film of a predetermined color is provided in each of the display pixels, wherein a pigmented film of the same color but lighter than the color of the pigmented film used in a unit pixel formed of the display pixels adjacent to the viewing angle control pixel is provided in each of the viewing angle control pixels.

13. The liquid crystal device according to claim 1, wherein a pigmented film of a predetermined color is provided in each of the display pixels, wherein a pigmented film having the same color of a pigmented film used in a unit pixel formed of the display pixels adjacent to the viewing angle control pixel but partly having a non-pigmented region is provided within each of the viewing angle control pixels.

14. An electronic apparatus comprising the liquid crystal device according to claim 1.

15. The liquid crystal device according to claim 1, wherein the portion of the plurality of viewing angle control pixels includes a first region with the first light transmissive pigmented film and a second region that does not include the first light transmissive pigmented film.

16. The liquid crystal device according to claim 1, wherein the portion of the plurality of viewing angle control pixels is of a first color depth which is lower than a second color depth of the first predetermined color of the first portion of the plurality of display pixels.

17. The liquid crystal device according to claim 1, wherein the first color is one of red, green, blue, yellow, magenta, cyan, and emerald green.

\* \* \* \* \*